United States Patent [19]

Allen et al.

[11] 4,346,390
[45] Aug. 24, 1982

[54] SOLID STATE RECORDER

[75] Inventors: Charles A. Allen, Richardson; David T. Houston, Houston, both of Tex.

[73] Assignee: Texas Instruments Incorporated, Dallas, Tex.

[21] Appl. No.: 156,455

[22] Filed: Jun. 4, 1980

[51] Int. Cl.³ .......................................... G01D 15/10
[52] U.S. Cl. ............................................... 346/76 PH
[58] Field of Search ................................... 346/76 PH

[56] References Cited

U.S. PATENT DOCUMENTS

| | | | |
|---|---|---|---|
| 3,949,408 | 4/1976 | Mason et al. | 346/76 PH X |
| 4,205,395 | 5/1980 | Shortridge | 346/76 PH X |
| 4,216,478 | 8/1980 | Giedd et al. | 346/76 PH X |
| 4,219,824 | 8/1980 | Asai | 346/76 PH |
| 4,249,186 | 2/1981 | Edwards | 346/76 PH X |

*Primary Examiner*—George H. Miller, Jr.
*Attorney, Agent, or Firm*—Mel Sharp; Rhys Merrett; Thomas G. Devine

[57] ABSTRACT

A chart recorder has a fixed thermal printhead for recording traces and annotations thereto representative of monitored parameters. A microcomputer, including timing, memory and control circuits controls the operation of the recorder which is enabled to print one or more traces simultaneously. The microcomputer control enables the printing of limit parameters, grids and times along with the traces. Further, the microcomputer provides for linearization of nonlinear parameters to be measured such as thermocouple temperature measurements and the like.

20 Claims, 40 Drawing Figures

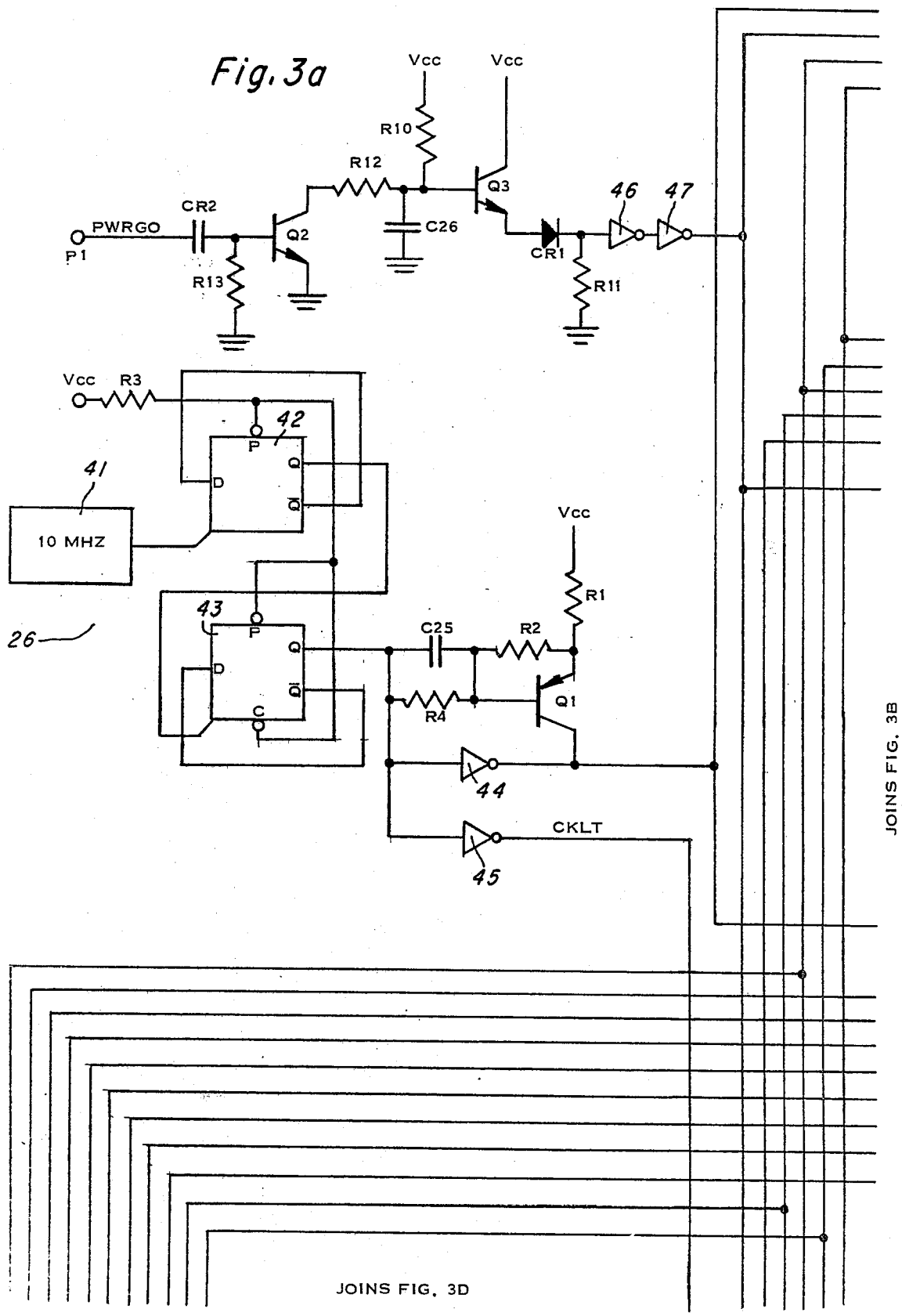

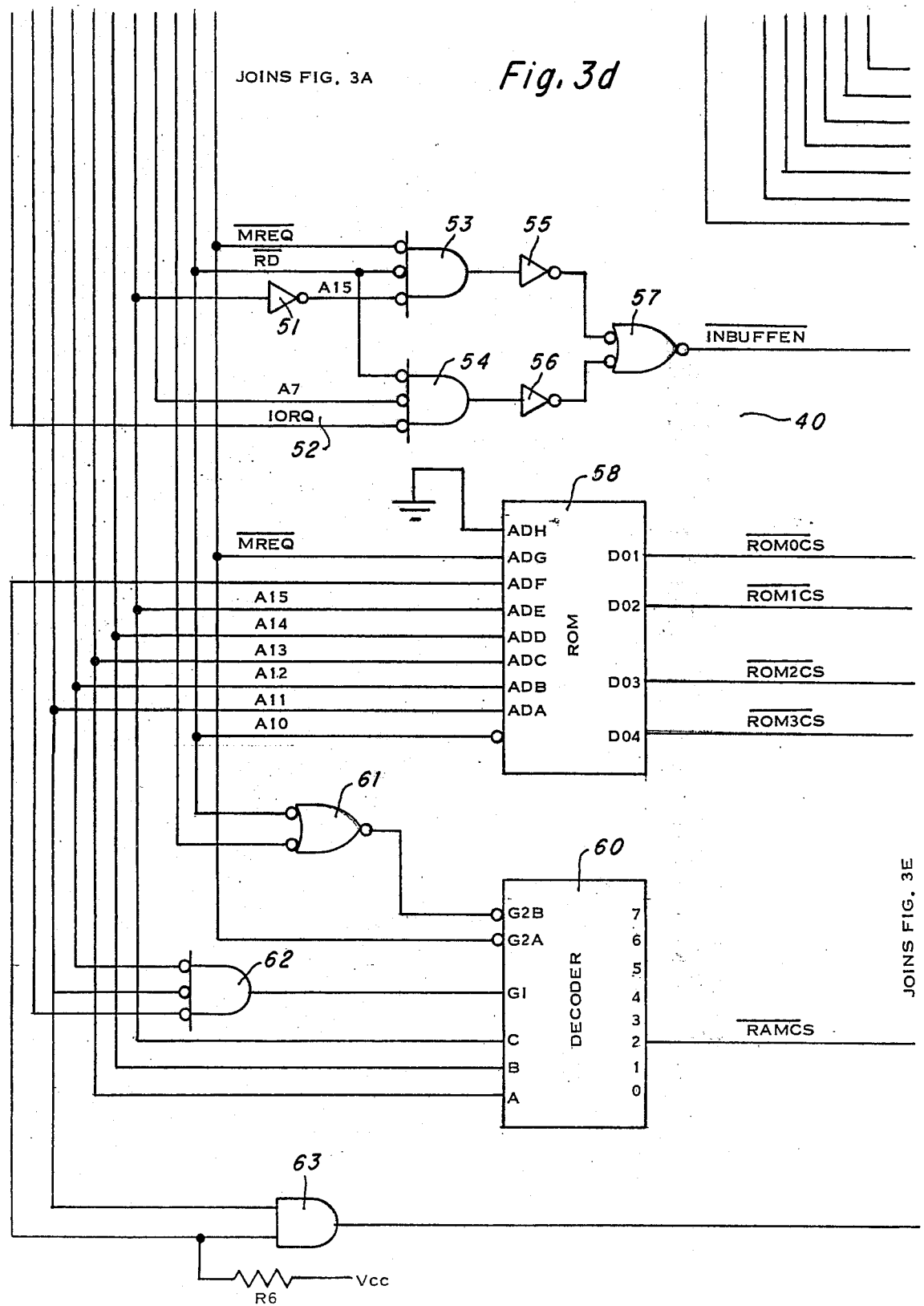

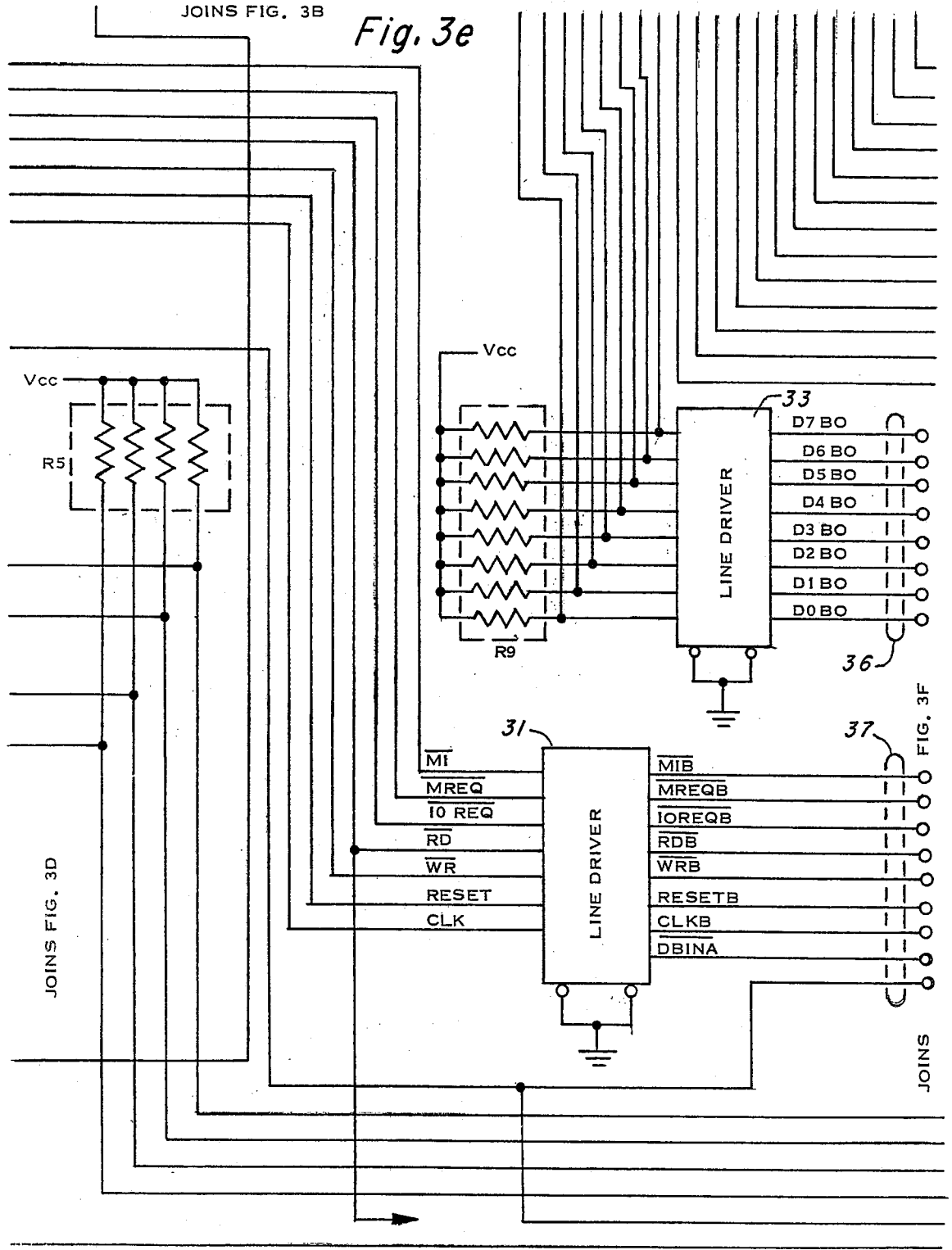

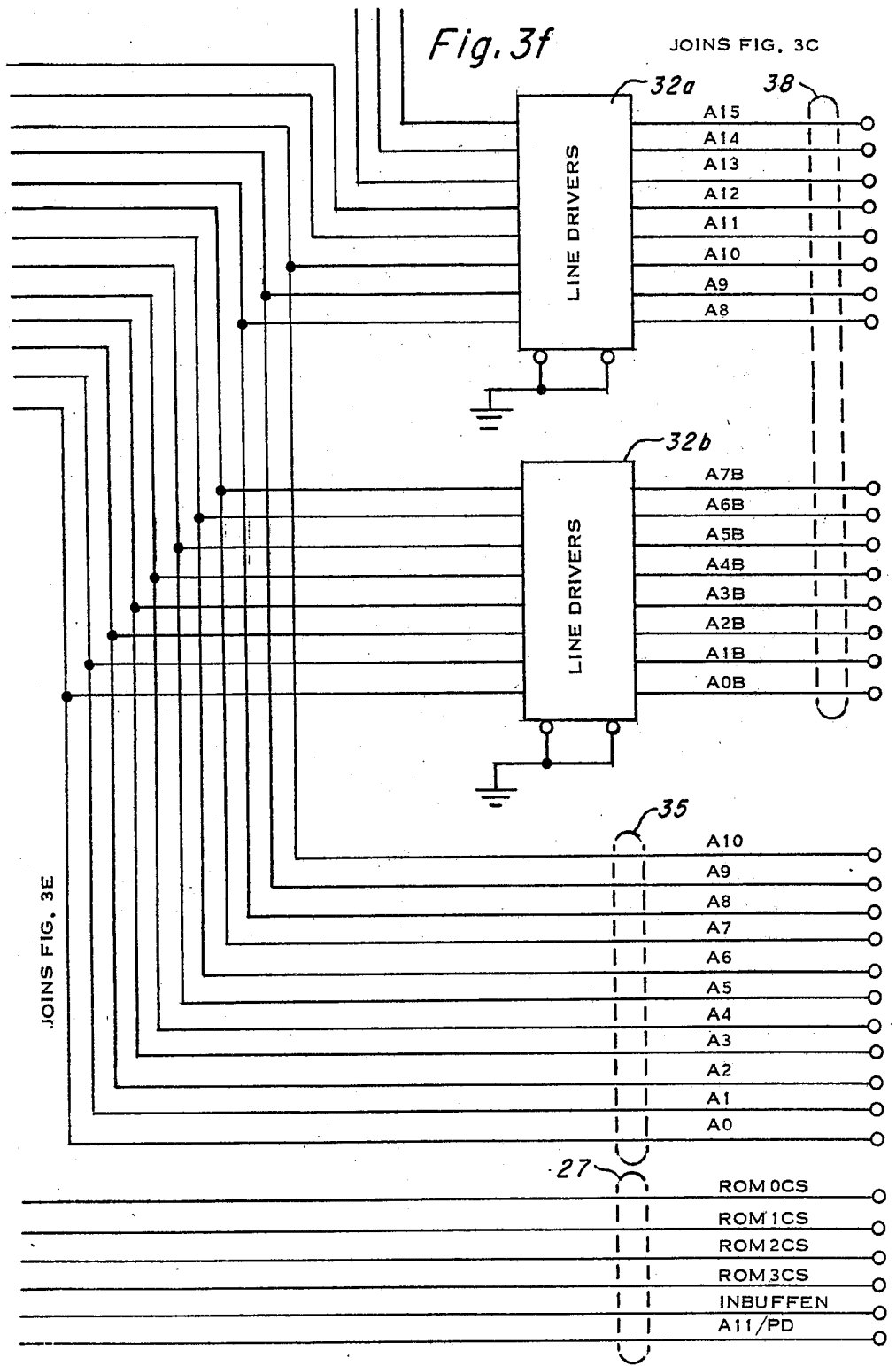

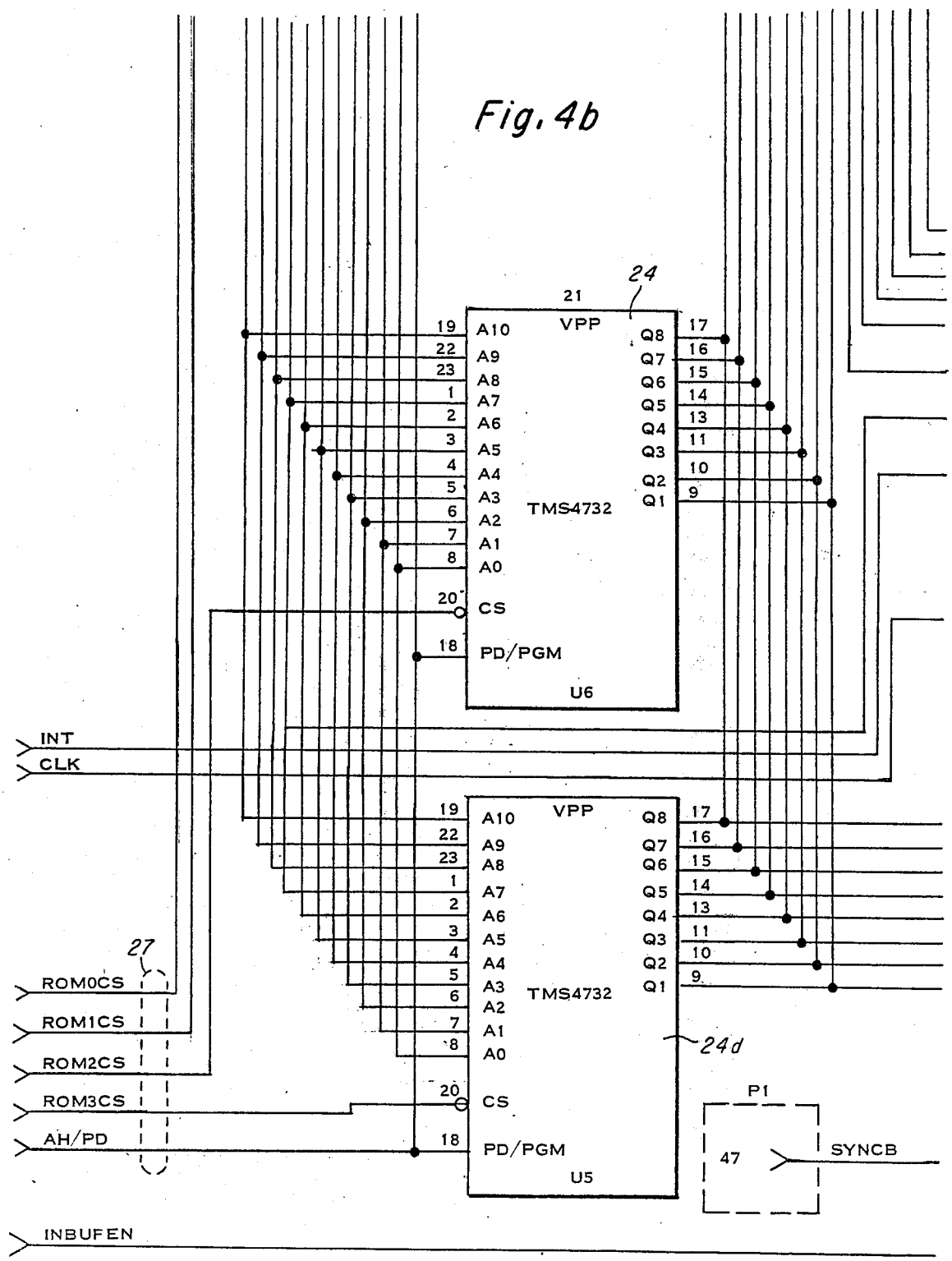

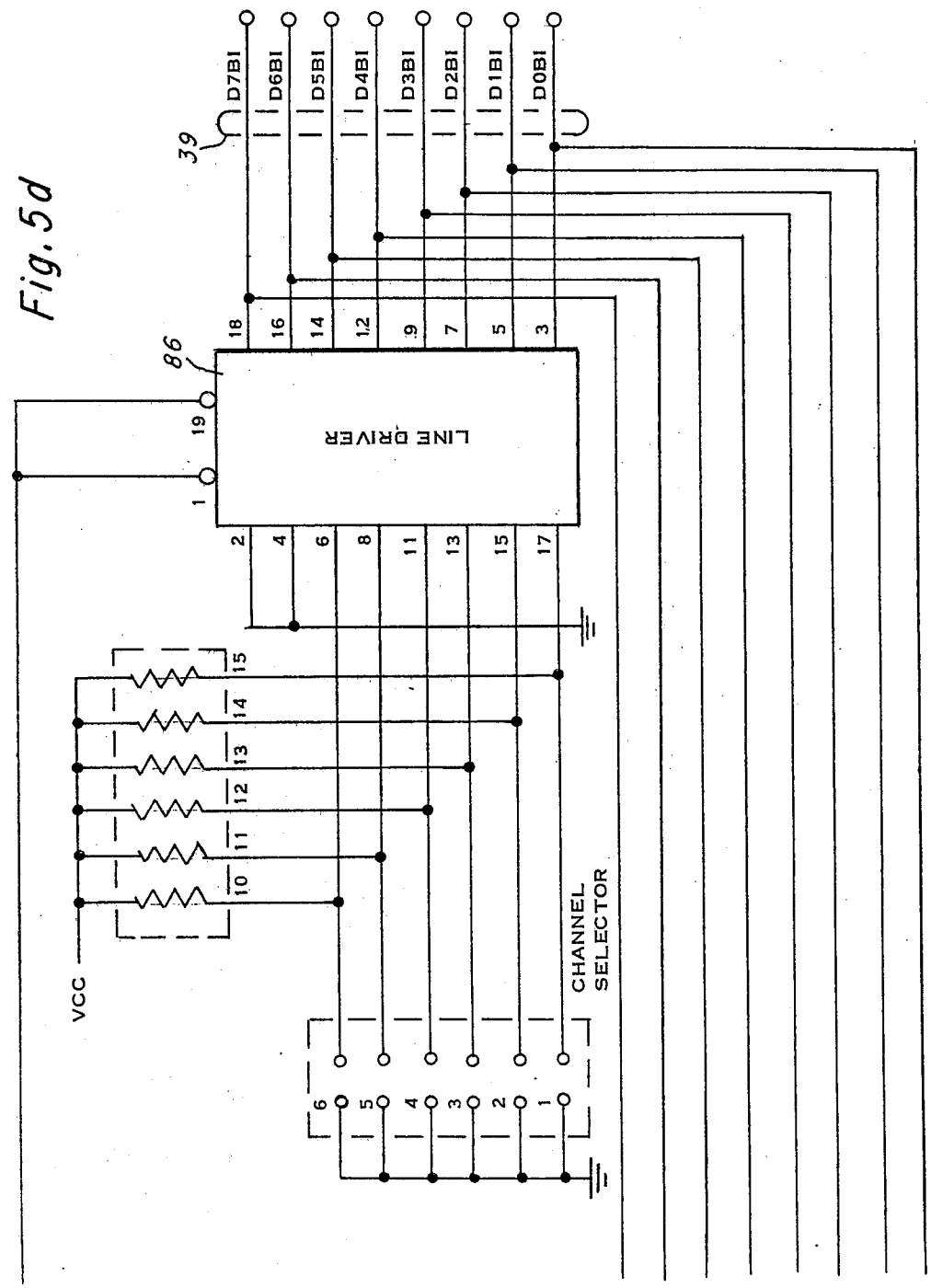

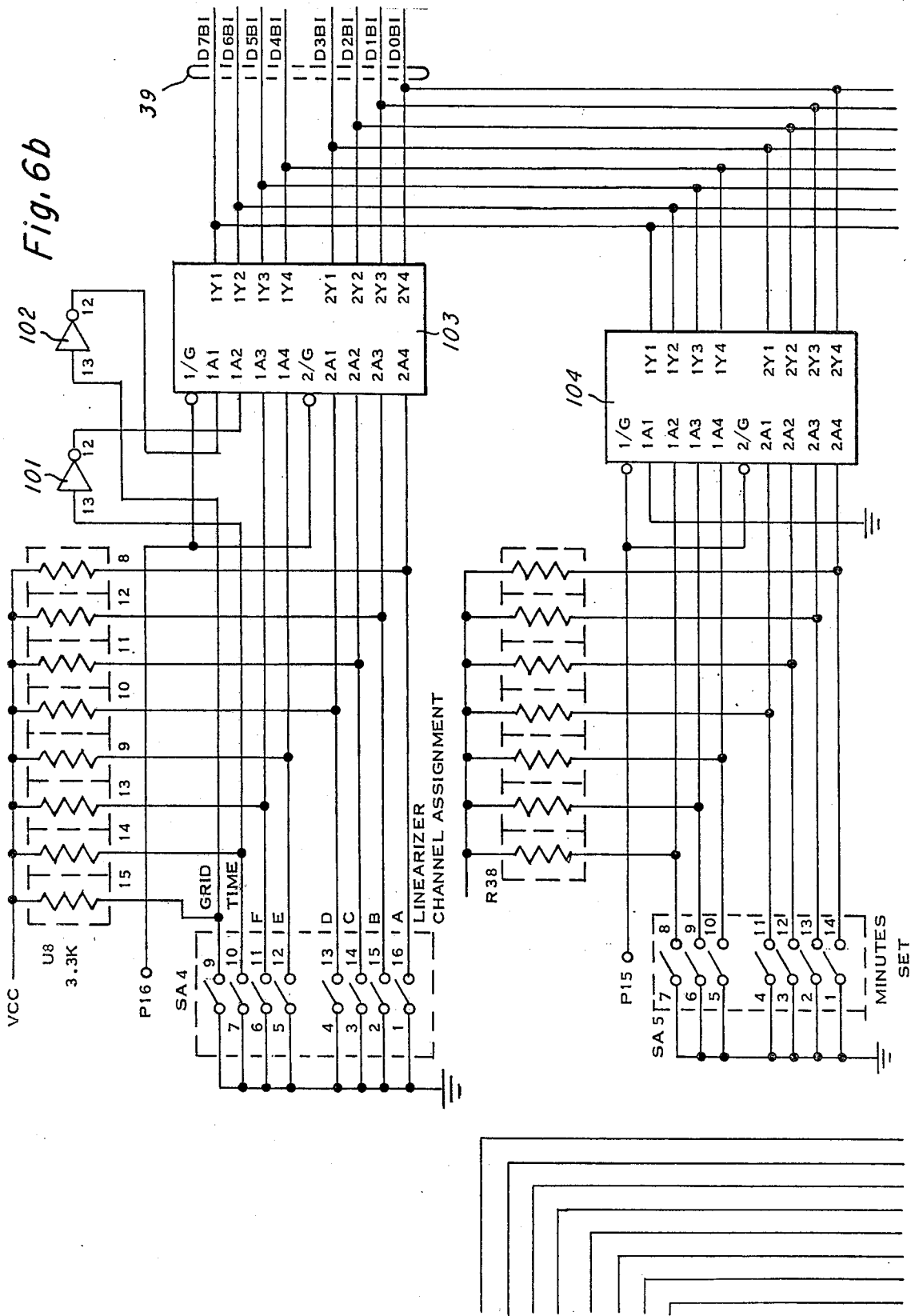

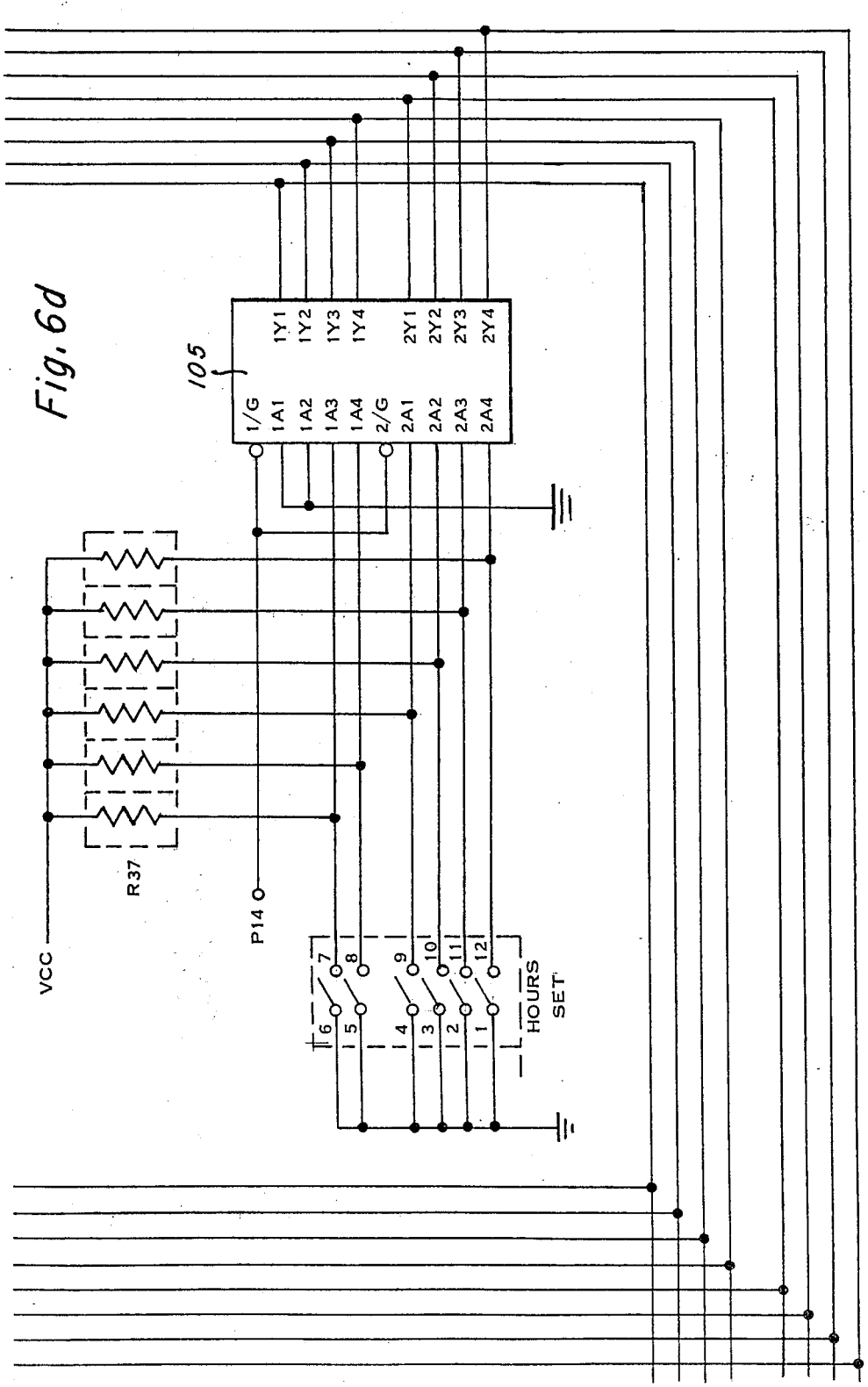

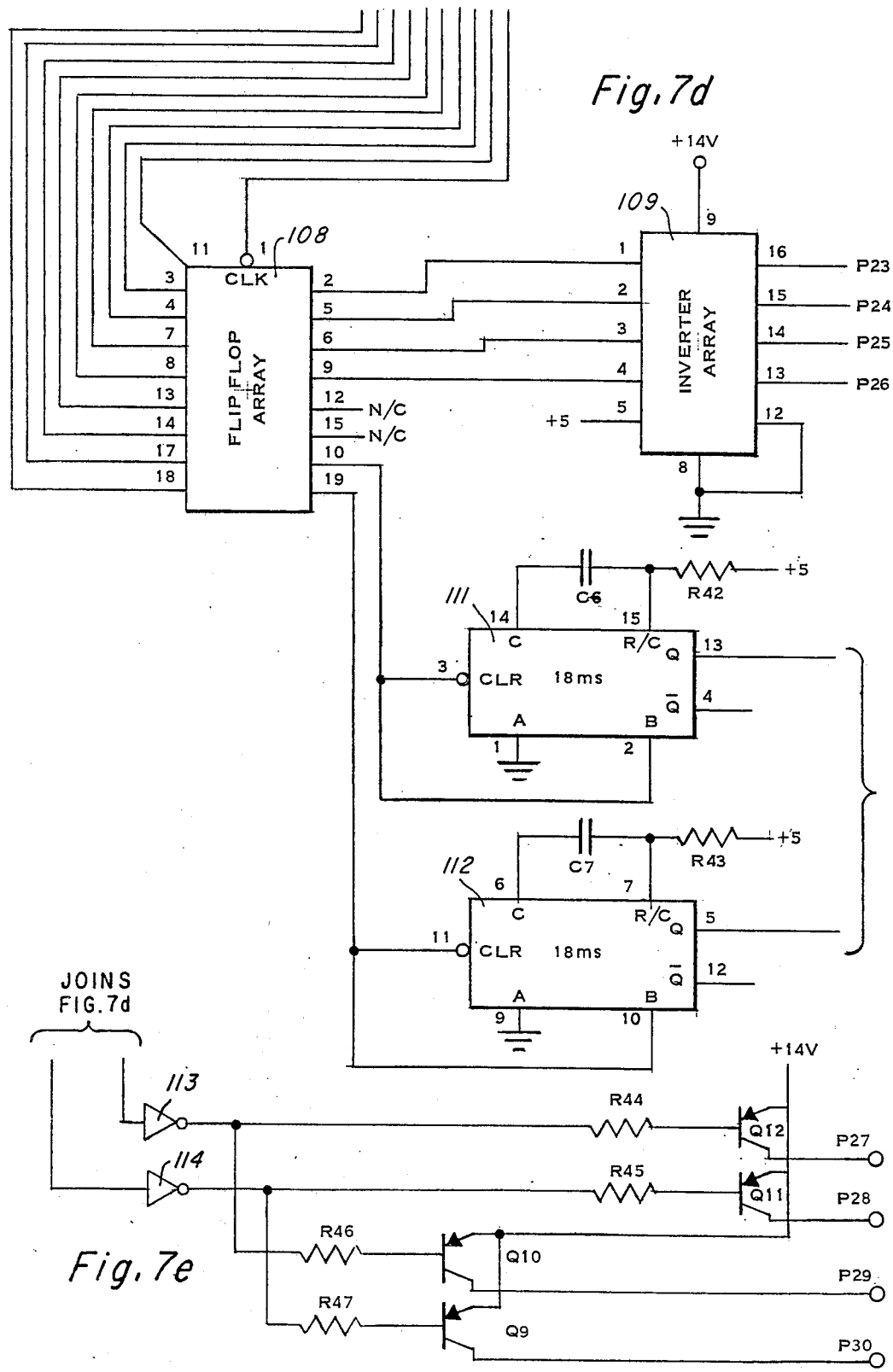

Fig. 13b

| CHANNEL | A | B | C | D | E | F |
|---|---|---|---|---|---|---|
| ALARM HI (%FS) | 71 | 95 | 80 | 75 | 70 | 64 |
| ALARM LO (%FS) | 39 | 15 | 20 | 25 | 30 | 35 |
| LINEARIZER | LOG | SQT | T2C | INV | INV | INV |
| CHANNEL SEL | ON | ON | OFF | OFF | OFF | OFF |

CHART SPEED: 20 SEC/INCH
PRINT INTERVAL: .2 SEC
INITIAL TIME — DAY: 39 HOUR: 23 MIN: 59
GRID: ON TIME PRINTING: ON

Fig. 14a

LOAD MAP

```
DK0:INIT  .OBJ[1]    ABS    BEG ADDR 0000    END ADDR 01FF
DK0:SSRTOP.OBJ[1]    REL    BEG ADDR 0200    END ADDR 0324
DK0:XLATE .OBJ[1]    REL    BEG ADDR 0325    END ADDR 039F
DK0:ODDMAP.OBJ[1]    REL    BEG ADDR 03A0    END ADDR 041B
DK0:EVNMAP.OBJ[1]    REL    BEG ADDR 041C    END ADDR 0485
DK0:CLEAR .OBJ[1]    REL    BEG ADDR 0486    END ADDR 0494
DK0:MARK  .OBJ[1]    REL    BEG ADDR 0495    END ADDR 04CD
DK0:ADVNCE.OBJ[1]    REL    BEG ADDR 04CE    END ADDR 050F
DK0:TIME  .OBJ[1]    REL    BEG ADDR 0510    END ADDR 0556
DK0:PRINT .OBJ[1]    REL    BEG ADDR 0557    END ADDR 05C2
DK0:STEP  .OBJ[1]    REL    BEG ADDR 05C3    END ADDR 05E3
DK0:GRID  .OBJ[1]    REL    BEG ADDR 05E4    END ADDR 0610
DK0:ISERV .OBJ[1]    REL    BEG ADDR 0611    END ADDR 067E
DK0:DT2LIN.OBJ[1]    REL    BEG ADDR 067F    END ADDR 0729
DK0:DATBIT.OBJ[1]    REL    BEG ADDR 072A    END ADDR 076B
DK0:ANALOG.OBJ[1]    REL    BEG ADDR 076C    END ADDR 0861
DK0:ACONV .OBJ[1]    REL    BEG ADDR 0862    END ADDR 08F2
DK0:ALMHDR.OBJ[1]    REL    BEG ADDR 08F3    END ADDR 0976
DK0:LIN   .OBJ[1]    REL    BEG ADDR 0977    END ADDR 0A24
DK0:ZCG5X7.OBJ[1]    ABS    BEG ADDR 0C00    END ADDR 1000
DK0:RAMMAP.OBJ[1]    ABS    BEG ADDR 1001    END ADDR 1001
```

SOLID STATE RECORDER

BACKGROUND OF THE INVENTION

1. Field of the Invention

This invention relates to strip chart recorders and more particularly to a fixed thermal printhead solid state chart recorder for thermal recording on heat sensitive paper.

2. Description of the Prior Art

In the prior art, strip chart recorders have been comprised of slide wires and servos in combination with pens and ink. The reliability and useful life of such recorders was limited.

More recently, movable head thermal printers have been employed for strip chart recording. These devices avoided the pens, pen motors and linkages necessary to implement the earlier recorders. An example of a thermal recorder capable of printing annotated traces is described and claimed in U.S. Pat. No. 3,840,878, issued on Oct. 8, 1974, entitled "Dual Mode Thermal Recorder" assigned to the assignee of this invention. A disadvantage of the dual mode thermal recorder is that not only is the paper moved, but the printhead is moved as well.

The invention described herein overcomes the disadvantages mentioned above. There are no pens, pen motors and linkages, or slidewires. Also, the printhead is fixed so that the only moving component is the chart drive system.

BRIEF SUMMARY OF THE INVENTION

A solid state chart recorder having a fixed printhead records on heat sensitive paper that is advanced at a selectable rate by a stepper motor. A microcomputer whose operation is dictated by the contents of read-only memory (ROM), provides versatility to the recorder. A plurality of input channels (six in this preferred embodiment) is received by the recorder and simultaneously converted from analog to digital signals. The microcomputer provides timing for the analog to digital conversion.

The microcomputer is made up of a microprocessor and a corresponding counter timer circuit together with random access memory (RAM) for temporary storage purposes, the controlling ROM and other control logic for gross selection of memory such as selection of a memory chip.

The recorder has a circuit for linearizing signals on any channel that require linearization. For example, temperature and pressure information is not linear and in the past was often recorded on paper graduated to accommodate such nonlinearity. The linearization circuit involves a ROM whose input addresses are keyed to the amplitude of the input digitized signals so that a corresponding predetermined linearized value is output at that particular address. In this preferred embodiment, up to four channels may be linearized.

This recorder also provides for event markers to mark the left and right side of the chart as desired by the user. For example, the user may apply a voltage by depressing a switch at the start of a test. Circuitry is provided to activate the printhead to mark the chart when the button is depressed for as long as the button is depressed. The user may switch voltages automatically to the event marker circuit as desired.

In this preferred embodiment, two lines of thermal elements are provided. The head is divided into equal segments, each segment containing offset lines of thermal elements so that the total head structure is made up of two staggered, equal parallel lines of thermal elements. Selected elements of one of the lines prints, followed by selected elements of the second line, after the paper has advanced an appropriate amount. In this manner, the power requirements are halved. The rotational speed of the stepper motor, as the prime mover for the chart paper, is controlled by the microcomputer and is adjustable within limits.

While synchronization is provided from the input power source, a facility for printing grid lines and associated time notation is also provided so that absolute synchronization of the chart is not required.

The principle object of this invention is to provide a strip chart thermal recorder having a fixed head, with a multichannel input capability and with the chart drive apparatus being the only moving parts.

Another object is to provide a thermal chart recorder where all input channels are recorded simultaneously.

Still another object of this invention is to provide a thermal strip chart recorder having facility for printing grids and times on the thermal paper.

Still another object of this invention is to provide a thermal strip chart recorder that electronically linearizes inputs requiring linearization.

Another object of this invention is to provide a thermal strip chart recorder that is controlled by a microprocessor.

These and other objects will be made clear in the detailed description that follows.

BRIEF DESCRIPTION OF THE DRAWINGS

FIGS. 3a–3f form a schematic diagram of that part of the microcomputer employed in the solid state recorder that employs that microprocessor.

FIGS. 4a–4c form a schematic diagram of that part of the microcomputer that employs the counter timer circuit.

FIGS. 5a–5d together form a schematic diagram of the interface circuitry of the solid state recorder.

FIGS. 6a–6d together are a schematic of the parameter set circuitry of the solid state recorder.

FIGS. 7a–7e schematically illustrate the drive circuitry for the solid state recorder.

Figure 14B:
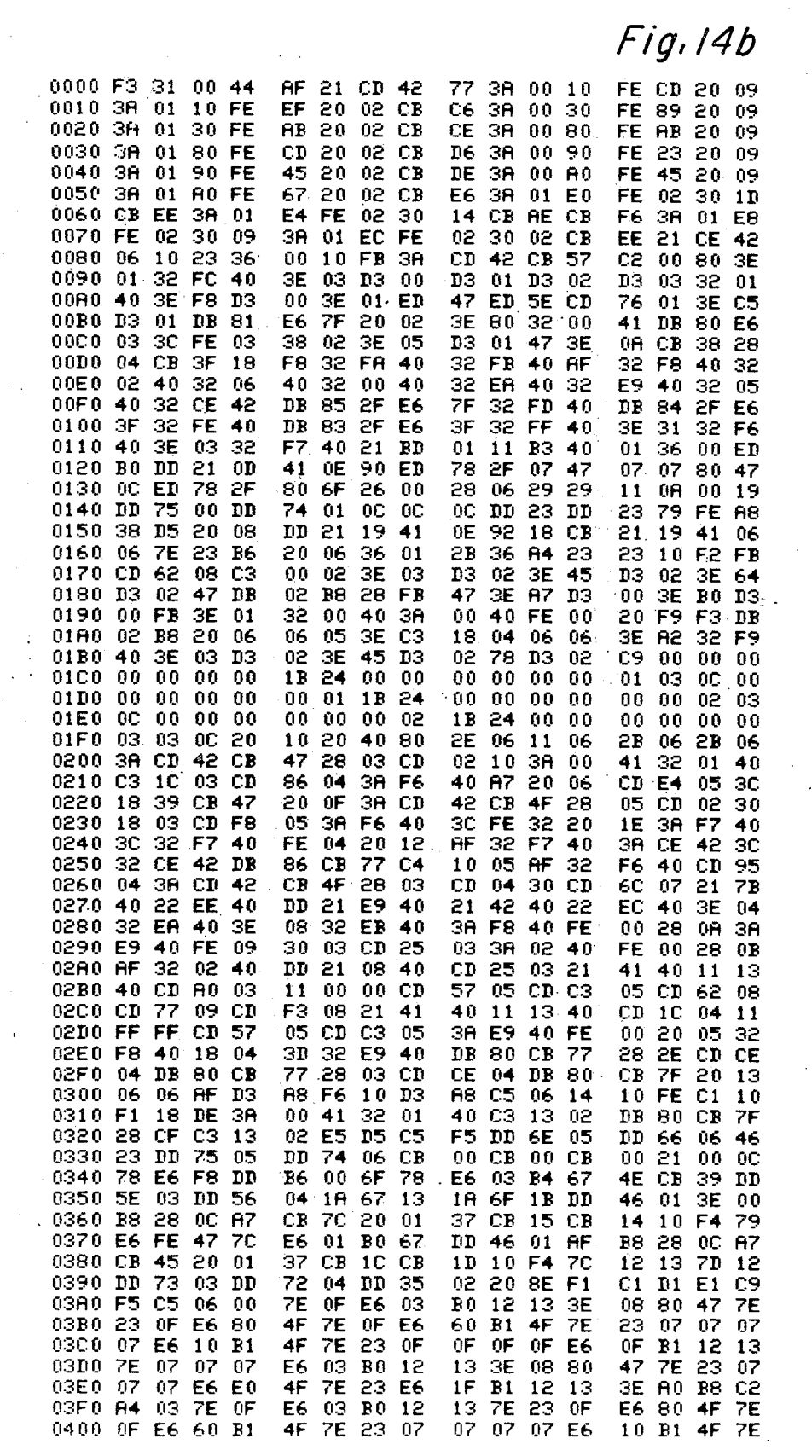
Figure 14C:
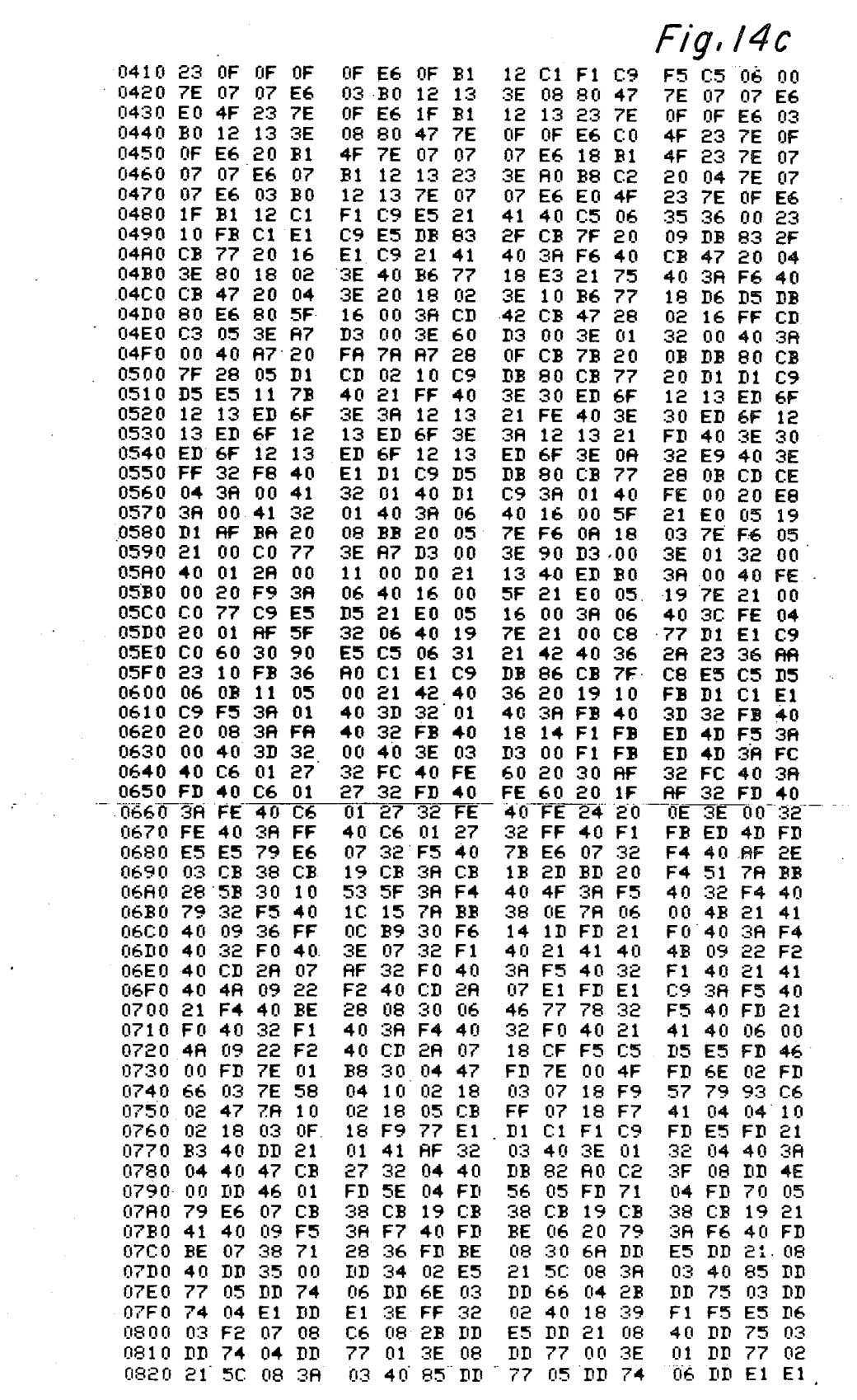
Figure 14D:
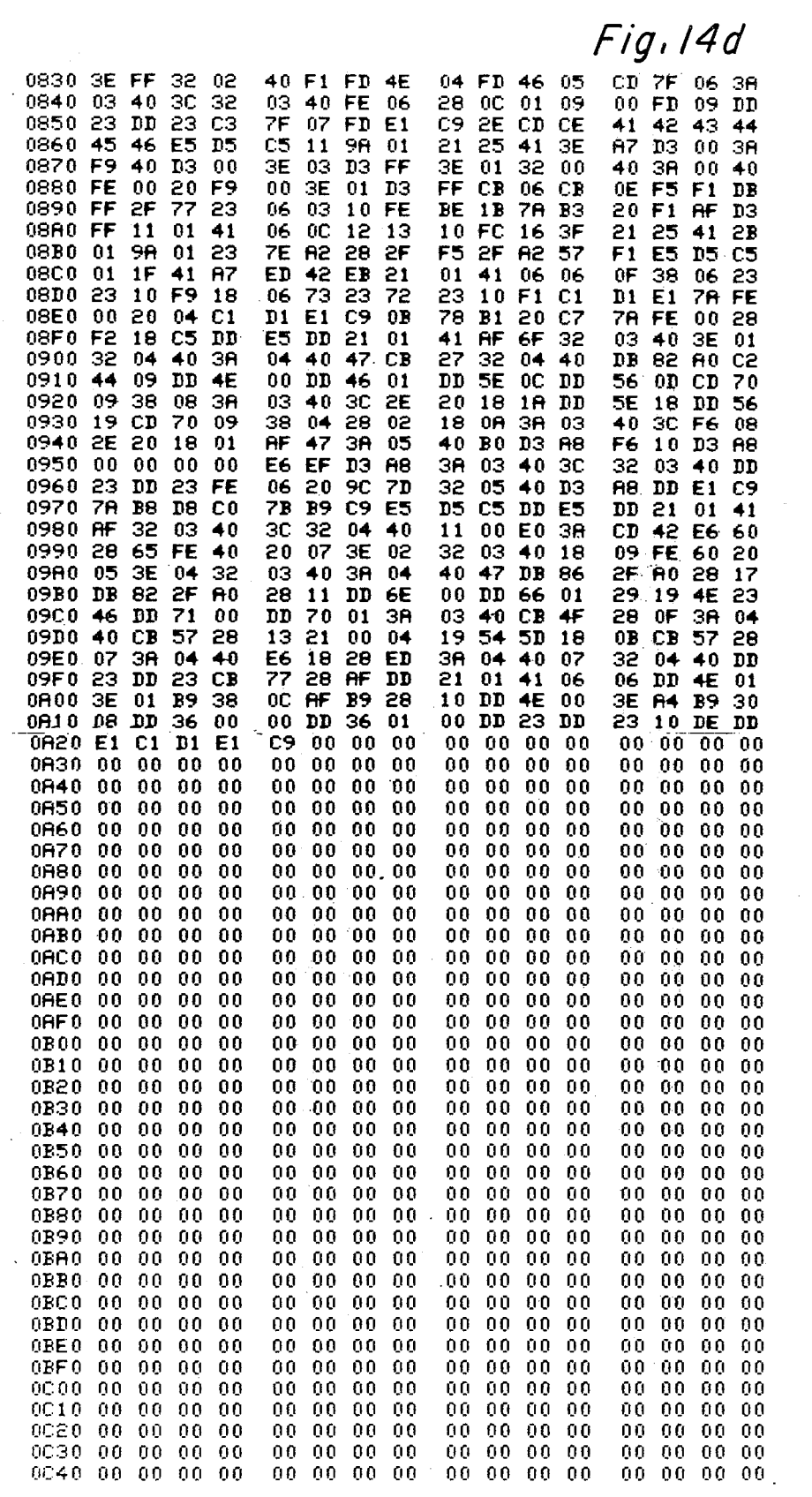
Figure 14E:
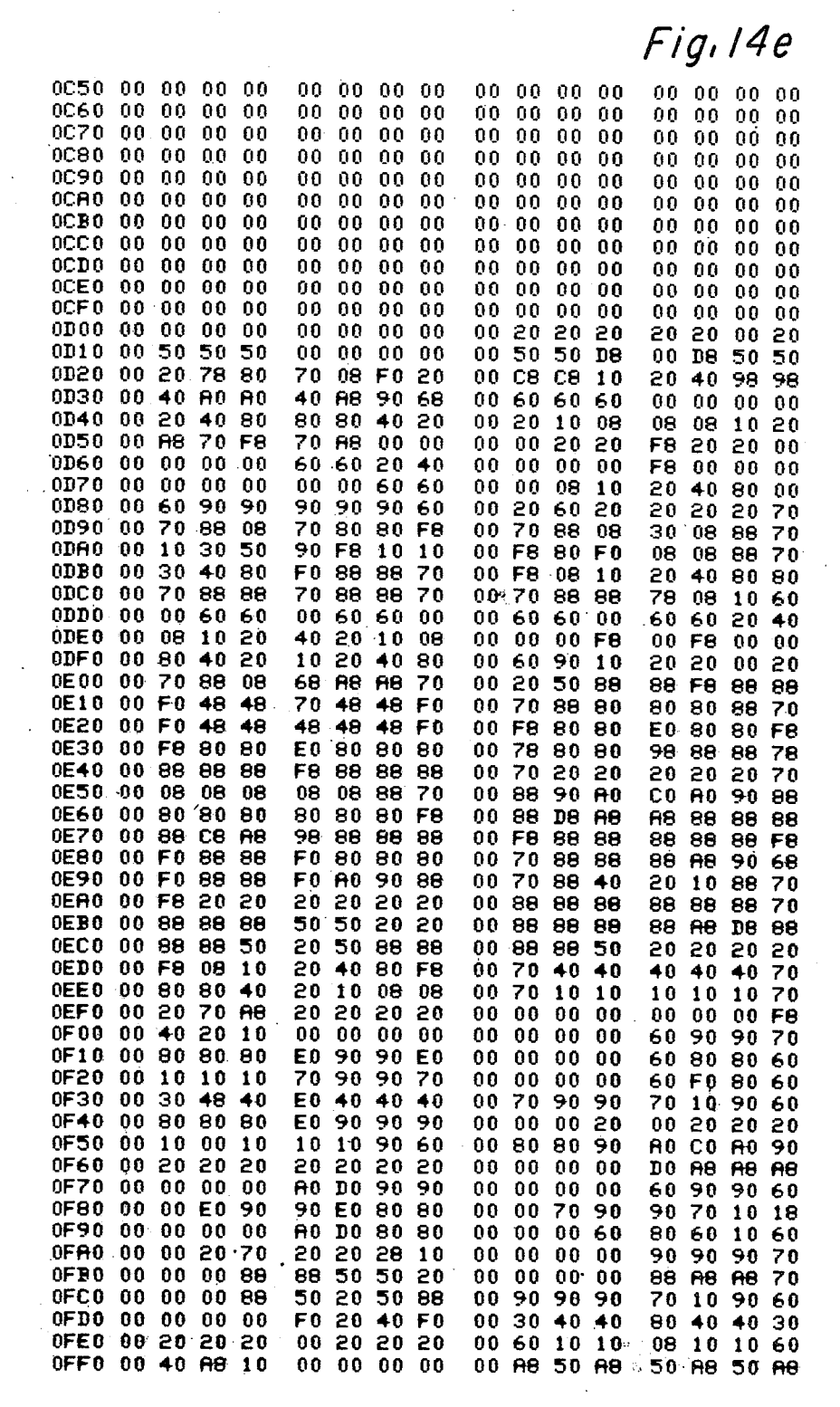
Figure 14F:
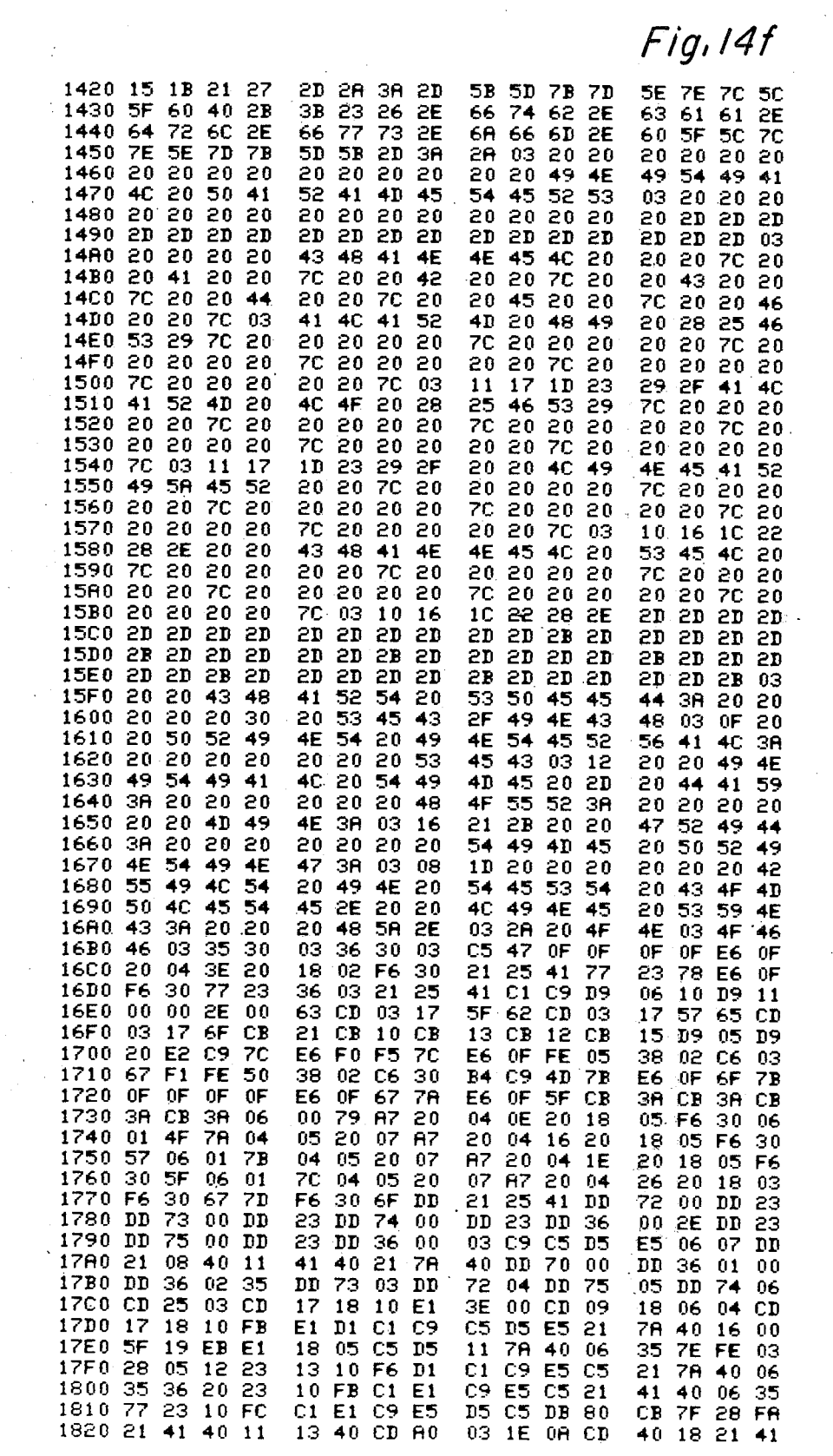
Figure 14G:
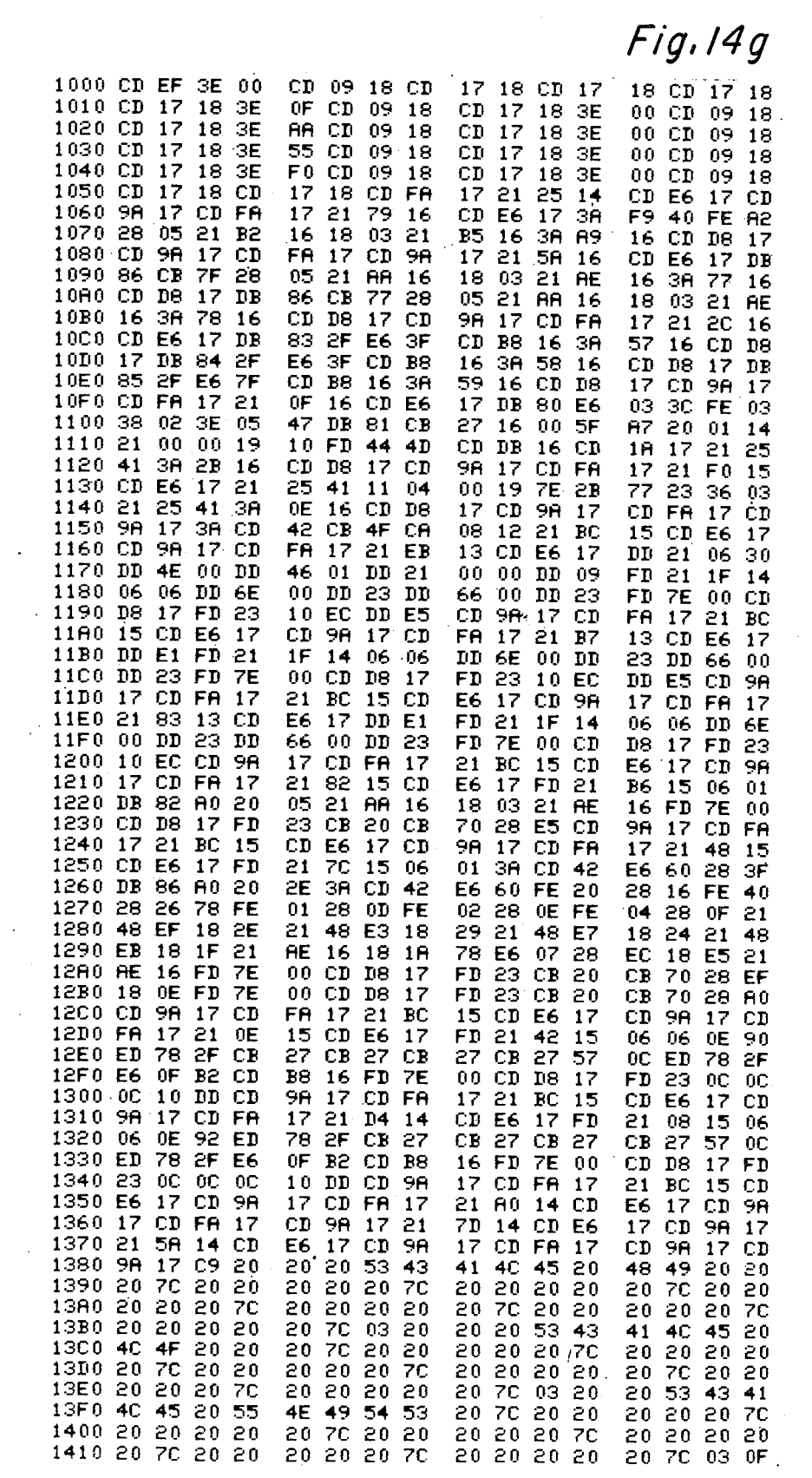
Figure 14H:
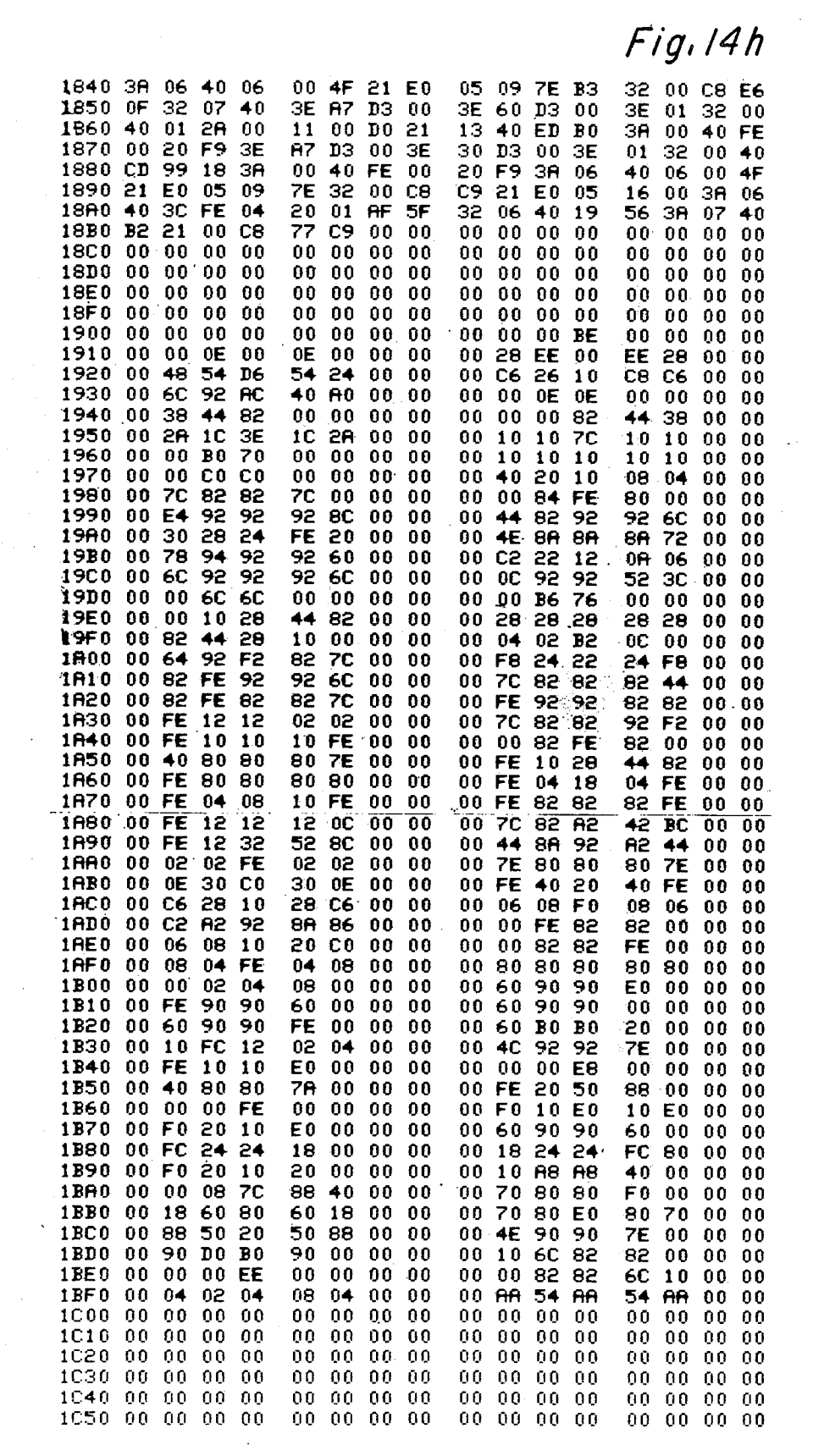
Figure 14I:
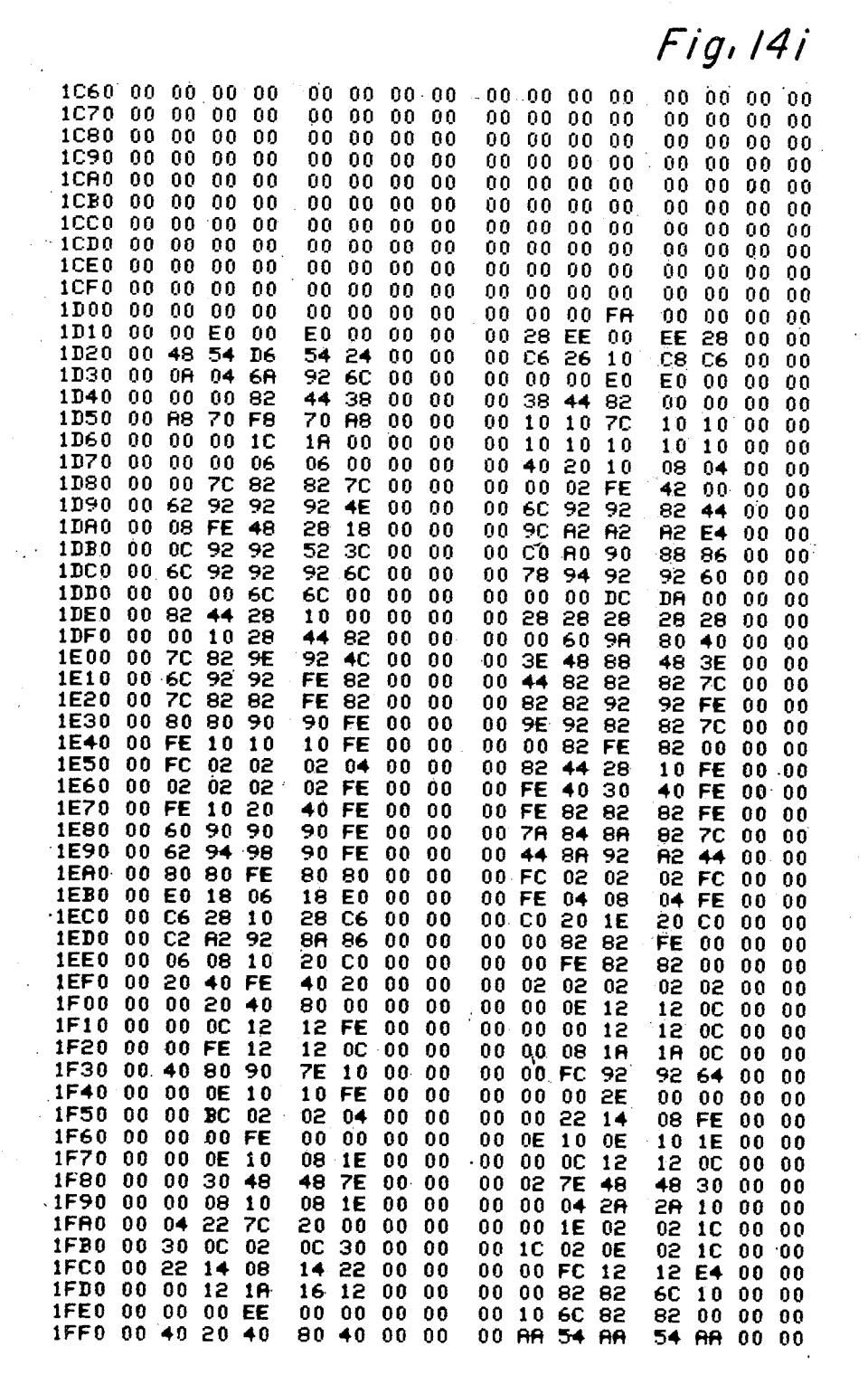

FIGS. 14a–14i is a map of the contents of the read-only memory that controls the operation of the solid state recorder.

DETAILED DESCRIPTION OF THE INVENTION

Figure 1A:
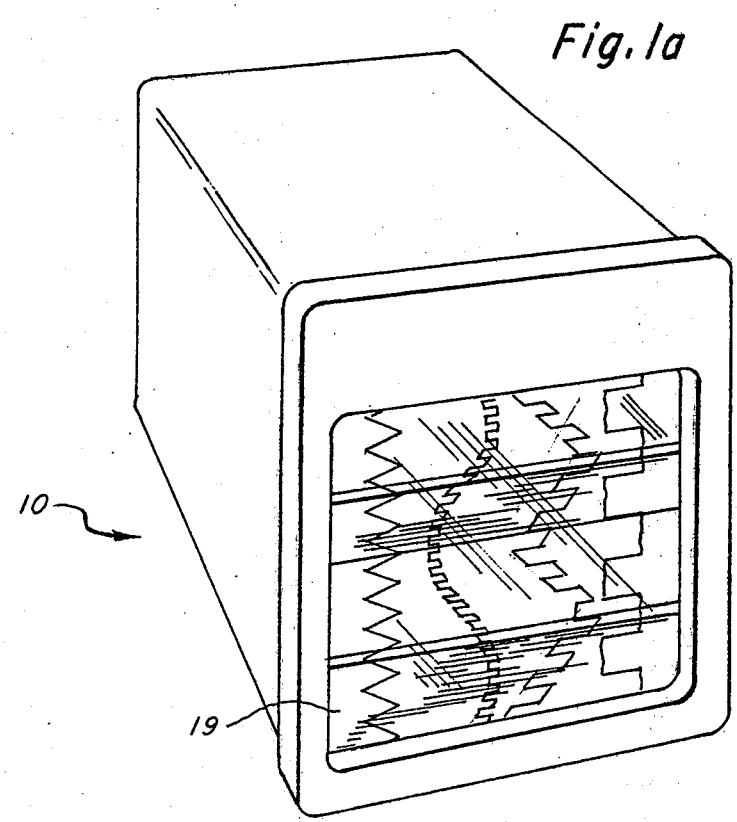
FIG. 1a is a perspective of the solid state recorder.

FIG. 1a illustrates solid state recorder 10 printing a record on thermal paper 19.

Figure 1B:
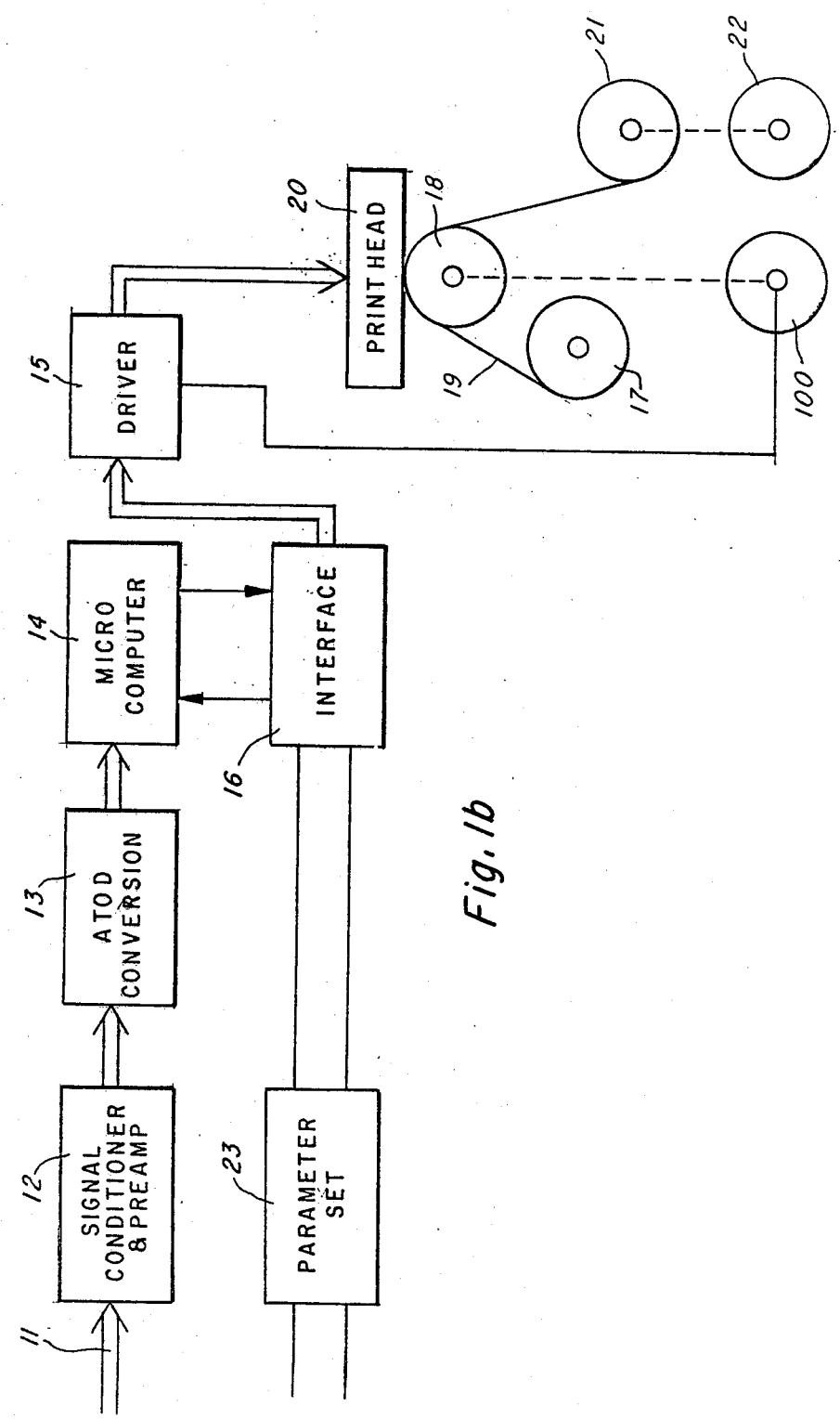
FIG. 1b is block diagram of the solid state recorder.

FIG. 1b illustrates solid state recorder 10 having analog inputs 11 which are conditioned and amplified through signal conditioner and preamplifier 12. The output from unit 12 is converted from analog to digital form by A to D converter 13 whose output provides input channels of digital data to CPU 14. CPU 14 is bi-directionally connected to interface 16 which in turn is bi-directionally connected to parameter set 23. The output of interface 16 provides inputs to driver 15 which activates printhead 20 and stepper motor 100. Thermally sensitive paper 19 is moved from supply roll 17 over roll 18, in thermal contact with printhead 20. Rewind roll 21 is moved by rewind motor 22.

The signal conditioner in preamp 12 is well known in the prior art and does not constitute part of this invention. Also, A to D conversion unit 13 is well known in the prior art and, in this preferred embodiment, employs six Texas Instruments type TL505C A to D converters so that six input channels from signal conditioner preamp 12 may be converted simultaneously. Stepper motor 100 is well known.

Figure 2:
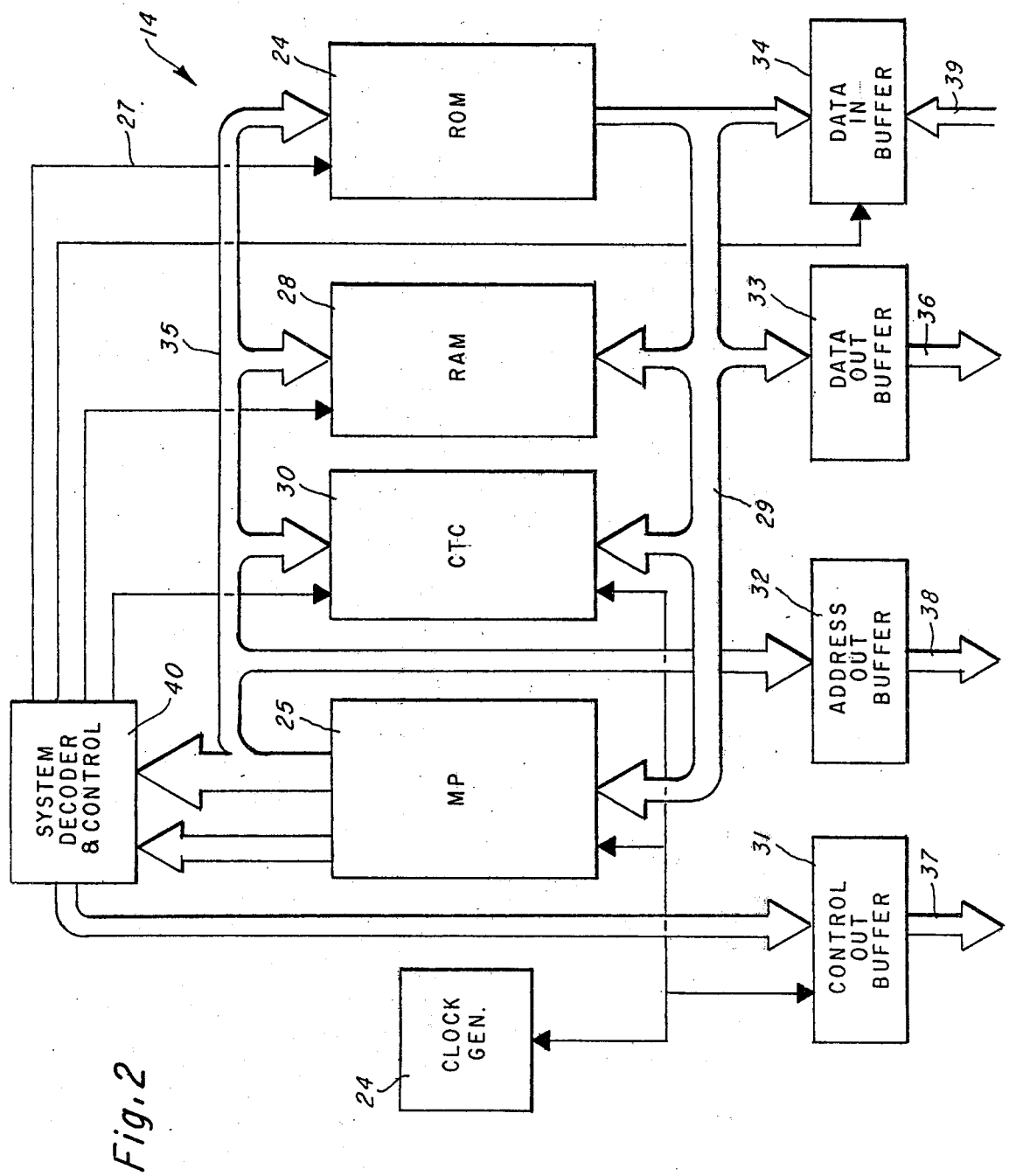
FIG. 2 is a block diagram of the microcomputer employed in the solid state recorder.
Figure 3B:
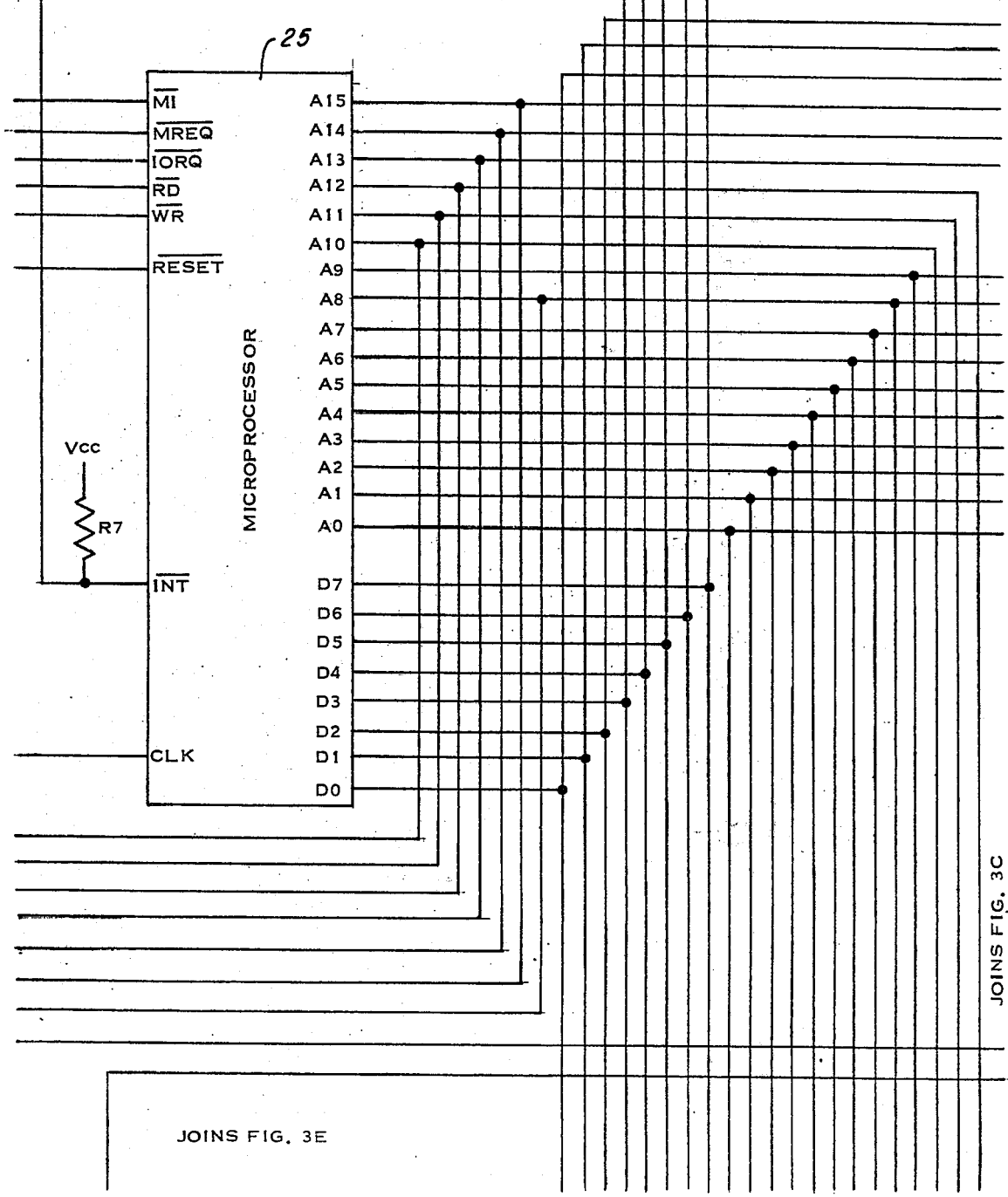
Figure 3C:
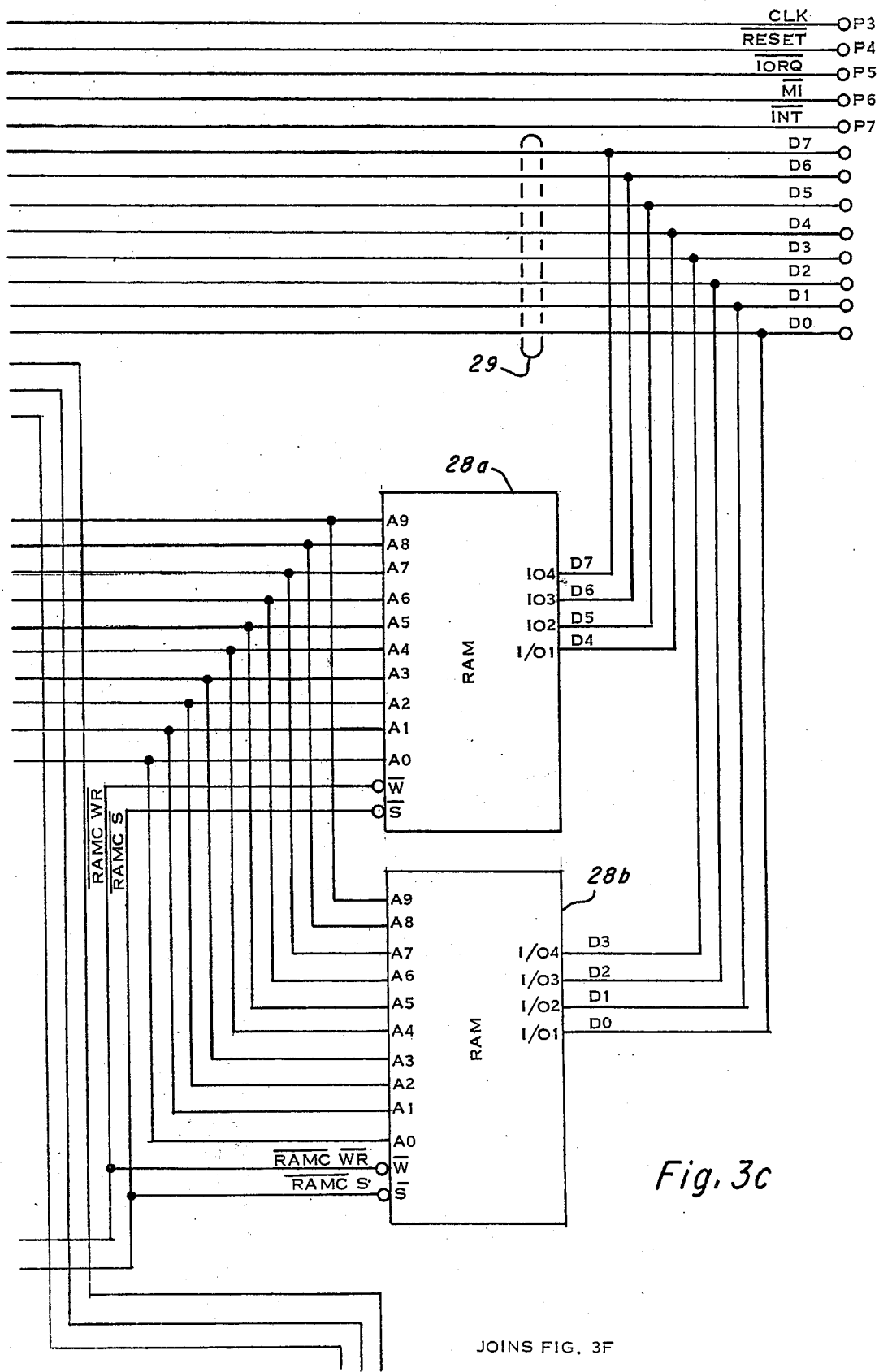

FIG. 2 illustrates clock generator 26 for providing clocking for the system. Microprocessor 25 is interconnected with the control timer circuit (CTC) 30, random access memory (RAM) 28 and read only memory (ROM) 24 by address bus 35 and data bus 29. Control signals from MP 25 and address bus 35 provide inputs to system decoder and control 40 whose control output signals provide inputs to control out buffer 31, whose output is control bus 37. Select signals 27 provide chip select to ROM 24. The system decoder and control 40 provides a chip select signal to RAM 28 and provides a system sync signal to CTC 30. Data IN signals are provided on BUS 39 to data IN buffer 34 whose output is data bus 29. Address bus 35 provides an input to address out buffer 32 whose output is address bus 38. Data bus 29 provides an input to data out buffer 33 whose output is data bus 36.

In this preferred embodiment, MP25 is a Z80 microcomputer MK3880 central processing unit and is described in the Mostek microcomputer Z80 Data Book copyright 1978 beginning at page 7. CTC 30 is a Z80 microcomputer MK3882 counter timer circuit described beginning on page 135 of the 280 Data Book. CTC 30 is a programmable component having four independent channels that provide counting and timing functions for microcomputer 14 based on MP25. CTC 30 is used to time certain events that are done by the microcomputer 14. For example, the A to D converter takes time to perform the simultaneous six conversions and that time is set by CTC 30. In this preferred embodiment, CTC 30 provides the timing to determine the time taken from charging an RC circuit to the decay of the charge through a reference voltage, thereby providing a digital value for an analog amplitude. This is a dual slope A to D conversion technique that is well known.

FIGS. 3a–3f schematically illustrate a part of CPU 14 of FIG. 1b. Clock generator 26 is shown as a 10 MHz crystal oscillator providing an input to flip flop 42 whose output provides an input to flip flop 43. A combination of flip flops 42 and 43 provides a divider with the output of flip flop 43 being at a frequency of 2.5 MHz in this preferred embodiment. The Q output of flip flop 43 is connected to one side of capacitor C25, resistor R4, inverter 44 and inverter 45. The other side of capacitor C25 is connected to the other side of resistor R4, to one side of Resistor R2 and to the base of transistor Q1. The other side of resistor R2 is connected to the emitter of transistor Q1 and to one side of resistor R1 whose other side is connected to voltage Vcc. The collector of transistor Q1 is connected to the output of inverter 44. The output of inverter 44 provides the clock input to microprocessor 25 and is also provided as an output on terminal P3. The output of inverter 45 is signal CLKT which is applied as an input to control out buffer 31 providing output signal CLKB in control bus 37. Capacitor C25, resistors R1, R2 and R4, inverter 44 and transistor Q1 comprise the clock driver circuitry.

For a proper initialization when power is applied, a power on clear circuit is provided. The power supply for the preferred embodiment of this invention is a well known switching regulator power supply providing an input at terminal P1 to form a signal PWRGD-. In this detailed description, it will be customary to describe the inverse or "not" function of a signal by referring to the signal followed by a hyphen. For example, the inverse of signal A is A-.

Signal PWRGD- passes through diode CR2 providing an input to the base of transistor Q2 which is also connected to ground through resistor R13. The emitter of transistor Q2 is grounded and the collector is connected through resistor R12, to one side of capacitor C26, the other side of which is grounded. The one side of capacitor C26 is also connected to voltage Vcc through resistor R10 and to the base of transistor Q3. The collector of transistor Q3 is connected to voltage Vcc, and the emitter is connected through diode CR1 to one side of resistor R11 and to the input of SCHMITT-trigger inverter 46 whose output is inverted through inverter 47. The other side of resistor R11 is grounded. Resistors R12 and R13, capacitor C26 and transistor Q2 form a filter to prevent erroneous triggering. Resistor R10 and transistor Q3 form an emitter follower stage to buffer capacitor C26. Resistor R11 provides the load for the emitter follower, the combination providing a solid logic 0 to SCHMITT trigger inverter 46. Diode CR1 provides a level shift to prevent SCHMITT trigger 46 from reacting to the slow exponential decay curve of capacitor C26. The output from inverter 47 is signal RESET- which is applied to the reset input of microprocessor 25, to output terminal P4 and to control out buffer 31 providing signal RESET B- and control bus 37. Therefore, when power is applied initially, the RESET- signal, generated from a filtering and buffering stage to avoid reaction to false initialization, provides a reset for the system.

System decoder and control 40 provides an input buffer enable signal (INBUFFEN-) as the output of AND gate 57. Signals MREQ- and RD- (memory request and read) from microprocessor 25 provide two inputs to OR gate 53. Address signal A15 from microprocessor 25 is inverted through inverter 51 and provides the third input to OR gate 53. Signals IORQ- and RD- from microprocessor 25 provide two inputs to OR gate 54. Signal A7 from microprocessor 25 is inverted through inverter 52 and provides a third input to OR gate 54. The outputs from OR gates 53 and 54 are inverted through inverters 55 and 56 respectively providing the two inputs to AND gate 57. Signal INBUFFEN- from AND gate 57 is output through control bus 37 as signal D BIN B- and is also provided on terminal P8.

Signals MREQ- and RD- are applied to terminals ADG and S1- of read only memory 58. Read only memory 58, in this preferred embodiment, is a Texas Instruments type 74S2871024 read only memory described beginning at page 4-1 of Texas Instruments "Bipolar Microcomputer Components Data Book for Design Engineers" dated January 1977. Voltage Vcc is applied, through resistor R6 to input ADF of ROM 58. Signals A11 through A15 from microprocessor 25 are applied as input to terminals ADA through ADE, respectively, of microprocessor 25. Output signals ROM0CS-, ROM1CS-, ROM2CS- and ROM3CS- from terminals D01-D04, respectively of ROM 58 provide chip select signals form ROMS 24A-24D and form bus 27. Voltage Vcc is applied through four resistors of resistor array R5 to terminals D01-D04 respectively.

AND gate 61 has input signals RD- and WR- from microprocessor 25, providing an input to terminal G2B and enabling the input of decoder 60. Signal MREQ- provides an input to enable input G2A of decoder 60. NOR gate 62 has as inputs signals A10, A11, and A12 from microprocessor 25 and provides enable input G1 to decoder 60. Decoder 60 is a Texas Instruments type 74LS138 3-to-8 line decoder, described beginning at page 7-135 of the Texas Instruments "The TTL Data Book for Design Engineers" copyrighted 1976. Signals A13, A14 and A15 provide signals for select inputs A, B and C respectively of decoder 60. The output signal from decoder 60 is a RAM chip select signal (RAMCS- for selecting RAM 28a or 28b. RAMS 28a and 28b, in this preferred embodiment, are Texas Instruments type TMS4045 ten twenty four word by 4-bit static RAM, described beginning at page 198 of Texas Instruments "The MOS Data Memory Book for Design Engineers" dated 1978.

Signal A11 provides one input to AND gate 63, the other input being provided by voltage Vcc. The output from AND gates 63 is signal A11/PD which is applied to output terminal T9.

System decoder and control 40 provides the gating signal for data input buffer 44. Also, through ROM 58 circuit 40 provides chip select signals ROM0CS- through ROM3CS- to select ROMs 24a through 24d respectively. Further, the RAM selection of RAMs 28a or 28b is provided from decoder 60. In this preferred embodiment, ROM 24d responds to input addresses 0000 to 1000; ROM 24c responds to input addresses 1000 to 2000; ROM 24a responds to addresses 2000 to 3000; ROM 24b responds to addresses 3000 and up. ROMs 24a through 24d are, in this preferred embodiment, Texas Instruments type TMS4732 4096-word by 8-bit read-only memory described beginning at page 139 of the MOS Memory Data Book.

Signals A0 through A15 of Microprocessor 25 are applied as inputs to line drivers 32b and 32a respectively, which, in this preferred embodiment, are Texas Instruments type 74LS244 noninverted 3-state output line drivers described beginning at page 6-83 of the TTL Data Book. The output from line drivers 32b and 32a form address bus 38.

Signals A0-A9 from microprocessor 25 provide the address inputs to RAMs 28a and 28b. The WE input for RAMs 28a and 28b is provided by signal RAMWE- from terminal WR- of microprocessor 25. Data output signals D0 through D3 are provided from RAM 28b and data output signals D4 through D7 are provided by RAM 28a forming data bus 29. Signals A0 through A10 form address bus 35. Signals M1-, MREQ-, IOREQ-, RD-, WR- and RESET- from the microprocessor 25 are all applied as inputs to control out buffer 31 which is a TI type 74LS244 line driver, mentioned above.

Signals D0 through D7 from microprocessor 25 are applied as outputs through data bus 29 and also as inputs to data out buffer 33 which is also a Texas Instruments type 74LS244 line driver, providing output data bus 36.

Figure 4A:
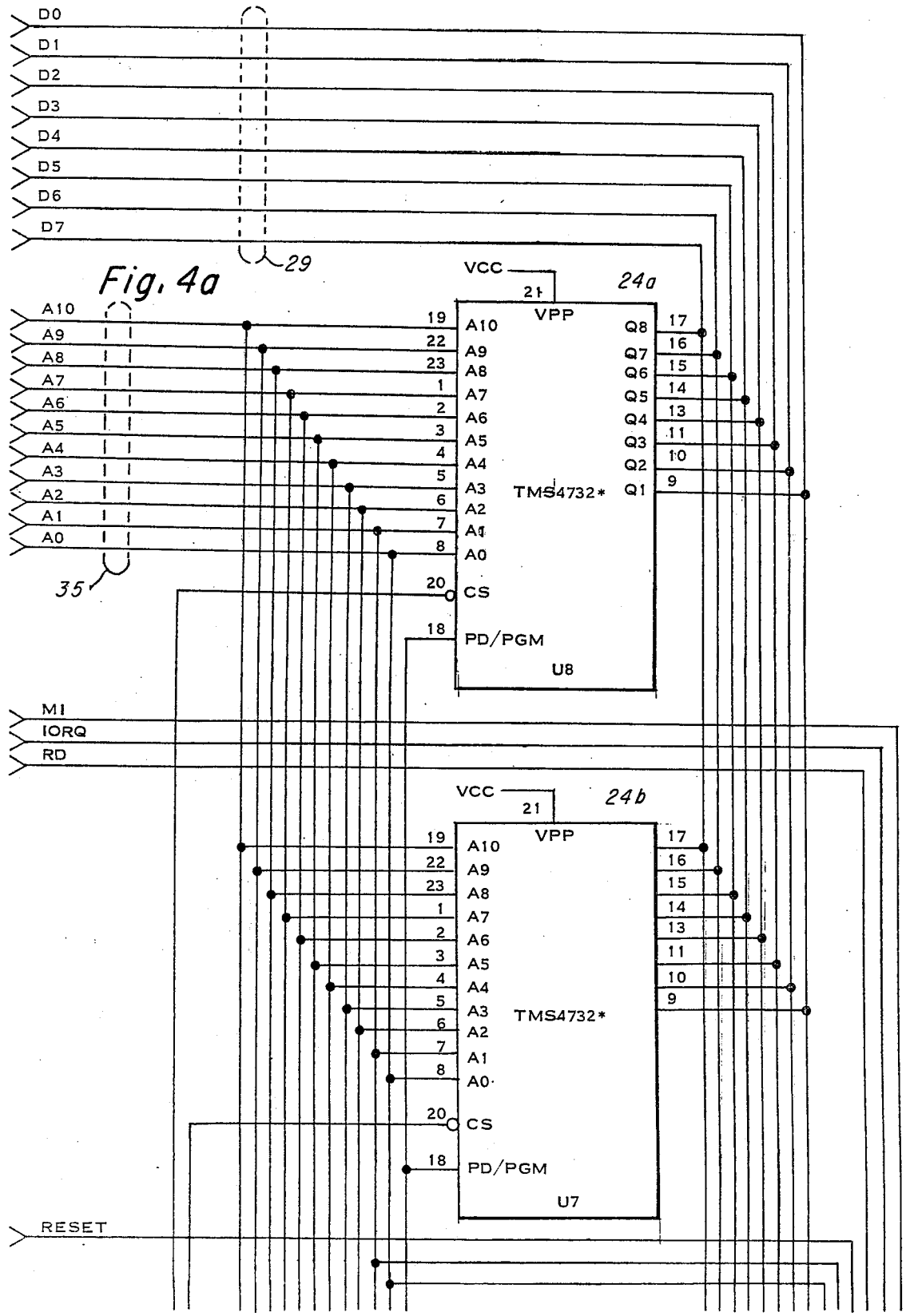
Figure 4C:
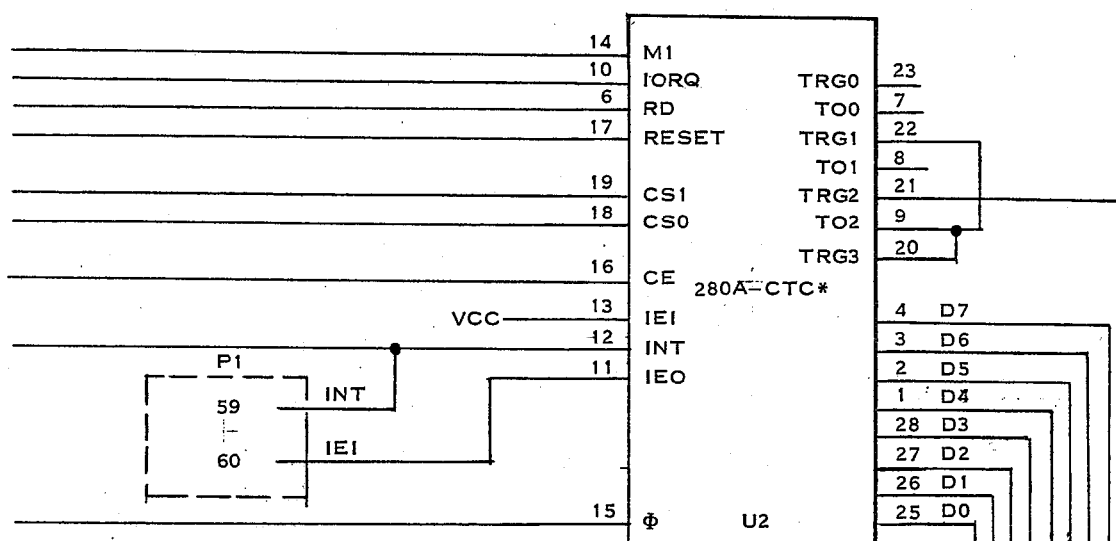

Referring now to FIGS. 4a-4c, address signals A0 through A10, making up bus 35 are applied to each of ROMs 24a through 24d. Voltage Vcc is applied to one of the chip select inputs so that the other chip select input is activated by the presence of one of signals ROM0CS- through ROM3CS- as applied to each of ROMs 24a through 24d respectively. Signal A11/PD is applied to 1018 of each of ROMS 24a through 24d so that A11 is maintained in a high state. The Q1 through Q8 outputs from each of ROMs 24a through 24d form data bus 29 with signals D0 through D7.

Signals D0BI through D7BI form bus 39 which is input to data input buffer 34, which is Texas Instruments type 74LS244 line driver. The output of data input buffer 34 is connected to bus 29 and to the input output registers of the counter timer circuit 30. Resistor bank R10 connects voltage Vcc to each of inputs D0BI through D7BI, through a resistance. Signal INBUFEN- from terminal P8 enables data input buffer 34.

Control signals M1-, IORQ-, RD-, RESET-, INT- and CLKB from control bus 37 are all applied to the corresponding terminals of CTC30. Signal SYNCB from terminal P10 is also applied to the appropriate input pin of counter timer circuit 30. The SYNCB signal derived from the 60 Hz or 50 Hz power input is applied to CTC30 to provide a sync for the system since the CTC30 is the basis for the timing.

FIGS. 5a-5d schematically represent the interface circuitry for interconnecting the various components of the solid state recorder. From address bus 38 signals A0B through A2B provide the three select signal inputs to decoder 81; signals A3B through A5B provide the three select signals to decoder 80. Signals A7B and A6B provide the enable signals on terminals G1 and G2A respectively of decoder 80. Signals A12B through A14B provide the select inputs to decoder 70 with signal A15B providing an input to enable terminal G1 of decoder 70. Decoders 70, 80 and 81 are Texas Instruments type 74LS138. Enable terminals G2A and G2B of decoder 70 have applied signals WRB- and MREQB- respectively from control bus 37. Signal IOREQB- provides the G2B enable input to decoder 80 and signal REDB- provides the G2A input signal to decoder 81, both of the signals coming from control bus 37. Signals D0BO through D7BO from bus 36 are provided as inputs to line driver 78 which provides output signals D0- through D7- forming data bus 36'. Line driver 78 is a Texas Instruments type 74LS240 inverted 3-state output line driver, described beginning at page 6-83 of the TTL Data Book.

Decoder 70 provides two output signals S1 and S2, respectively. These signals derive from the translation of address bits and are used as memory strobe pulses. Both are applied as inputs to line driver 75 providing outputs on terminals P17 and P18 respectively. Signal S1 from decoder 70 is inverted through NAND gate 68 and provides one input to NAND gate 69 whose other input is provided by address signal A0B from address bus 38. The output is the clock input to flip flop 72 whose D input is held high by voltage Vcc applied through resistor R28 which is also applied to the inverse preset input. The Q output of flip flop 72 provides the D input to flip flop 73 whose clock input is provided by signal CLKB from address bus 38 and whose inverse preset output is provided by voltage Vcc applied through resistor R28. Flip flop 73 has a Q output that provides the D input to flip flop 74 whose clock output is provided by signal CLKB and whose inverse preset input is provided by Vcc. The Q output of flip flop 74, by virtue of this logic, is two clock pulses wide and is applied as an input to driver 75 and applied as output signal STB to terminal P20. The Q- output of flip flop 74 provides the inverse clear input to flip flop 72. Signal RESETB- from control bus 38 provides the inverse clear input to each of flip flops 73 and 74. Address signal A0B provides another input to driver 75 and is provided as an output at terminal P19.

A power line sync pulse from the power supply (not shown) is provided at terminal P11 and is applied to the base of transistor Q4, which base is connected to voltage Vcc through resistor R26. The collector of transistor Q4 is connected through resistor R27 to voltage Vcc and its emitter is connected directly to ground. The collector of transistor Q4 is also connected through resistor R27 and through resistor R28 to both inputs of positive NAND Schmitt trigger 77. Capacitor C2 has one terminal connected to the intersection of resistors R27 and R28 and the other terminal connected to ground. The combination of resistors R27 and R28 and capacitor C2 make up a low pass filter. The low pass filter and the Schmitt trigger 77, together with transistor Q4 perform signal conditioning of the 60 or 50 hertz power line sync signal. The output of Schmitt trigger 77 is a clean signal. However, this signal is susceptible of having false transitions which are removed by monostable multivibrator 76 (Texas Instruments type 74LS123 described beginning at page 6-76 of the TTL Data Book). The output of Schmitt trigger 77 is connected to the B input of one shot multivibrator 76. Voltage Vcc is applied through resistor R14 to terminal R/C of one shot 76. One terminal of capacitor C16 is tied to terminal R/C and the other terminal of capacitor C16 is tied to terminal C of one shot 76. The Q output of one shot 76 is tied back to the A input thus making it a non-retriggerable one shot. This connection forms a one shot multivibrator that may have a 100% duty cycle, but still not be retriggerable. The circuit then cleans up any false transitions and transients on the sync line. The Q- output of one shot 76 provides the final input to line driver 75 and is applied as signal sync B to terminal P10.

Decoders 80 and 81 are part of a control switch interface. One output of decoder 80 is utilized, providing the G2B enabling input for decoder 81. Signal RDB- provides the G2A enable signal with voltage Vcc being applied through resistor R30 to the G1 enable terminal. As mentioned earlier, signals A0B through A2B are the select signals. Four outputs from decoder 81 are impressed on terminals P13 through P16, respectively. The fifth, sixth and seventh outputs from decoder 81 provide an enable input to line drivers 86, 83 and 84 respectively. Line drivers 83, 84 and 86 are all Texas Instruments type 74LS244. The sixth output of decoder 81 is also impressed on terminal P12.

Print rate selector switch array SA1 is made up of nine single pole, single throw switches with the first terminal of each connected together to ground. The second terminal of each of the nine switches is connected, through a resistor of resistor array R11, to voltage Vcc. The junction between the second terminal and resistor of the first through seventh switch of switch array 1 is connected to inputs of line driver 84. The junctions of the second terminals of switches 8 and 9 and the resistors provide two inputs to line drivers 83. The outputs of line drivers 83 and 84 are connected into bus 39 which is an input data bus providing input signals D0BI thorugh D7BI to data input buffer 34 of FIG. 3. Thus line driver 83 provides the two most significant bits of the print read selector and line driver 84 provides the least seven significant bits of the print read selector to the bus 39.

Channel selector switch array SA2 has six single pole, single throw switches, with the first terminal of each being tied together to ground. The second terminal of each is applied as an input to line driver 86, a Texas Instruments type 74LS244. Resistor array R12 comprises six individual resistors, each tied to voltage Vcc and the other end of each being tied to the second terminal of the six individual switches of channel selector switch array SA2. The output of line driver 86 is tied to data input bus 39.

Referring now to FIGS. 6a-6d, a schematic diagram of the parameter set circuitry is presented. Address signals A0B through A9B from the bus 38 are presented as address inputs to linearizer ROM 94. In this preferred embodiment, the linearizer ROM is made up of two Texas Instruments type TMS2516 read-only memories described beginning at page 200 of the MOS memory data book. If one channel were to be linearized, a memory of 1K by 8 bits could be used. If two channels are to be linearized, then two K by 8 bits is necessary. When two TI type TMS2516 ROMS are used, four channels may be linearized. Linearizer ROM 94 shown schematically represents one half of one type TMS2516 memory with four chip enable inputs. Address signals A10 through A15B of bus 38 are applied to an inverter NAND gate network. Also applied are control signals MREQB- and RDB- from bus 37. Signals MREQB-, RDB-, A12B, A11B and A10B are each inverted through inverters 89, 88, 91, 90 and 92, respectively. The outputs of each of these inverters is applied as an input to NAND gate 93, as are signals A15B, A14B, and A13B. The output of NAND gate 93 is applied to terminal B12 and to terminal CE2 of linearizer ROM 94. It is also applied to enable terminals 1/G and 2/G of line driver 95, a type 74LS244. The logic described above simply provides for reading from any address between E000 and EFFF (hexidecimal).

Voltage Vcc is applied through resistor R30 to terminals E1 and E2. Terminals E3 and E4 are grounded. Terminal E9 is connected to receive signal A11B and terminal E10 is connected to receive terminal A10B. Terminals E7, E8, E5 and E6 are connected to chip enable terminal CE1, CE2, CE3 and CE4 respectively. By selective interconnection between the E terminals, 1, 2, 3 or 4 channels may be selected.

The outputs from linearizer ROM 94 provide inputs to line driver 95 whose outputs are connected to bus 39.

As explained earlier, event markers may be selectively employed by the user of the solid state recorder. Terminals P25 and P26 receive an external voltage, either AC or DC at a time and for a duration of time directed by the user. The voltage is impressed across diode bridge 96 one output of which is impressed through resistor R32 on the collector of transistor Q6 and on the anode of the diode section of opto coupler U10. The other side of diode bridge 96 is connected to the emitter of transistor Q6 and to the cathode of the diode section of opto coupler U10. The base of transistor Q6 is connected to the anode of zener diode CR6 whose cathode is connected to the collector of transistor Q6. The circuit made up of resistors R32 and R33, diode CR6 and transistor Q6 provide essentially constant current to the opto coupler U10. The receiver transistor of U10 has its base not connected, its emitter tied to ground and its collector tied to voltage Vcc through resistor R37 and to ground through capacitor C8. Resistor R37 and capacitor C8 provide filtering to remove any noise and to convert any pulsating DC to steady state DC. The filtered output from opto coupler U10 is provided as an input to line driver 98, a type 74LS244. A select signal from decoder 81 impressed on terminal P13 is used to enable line driver 98.

Terminals P27 and P28 receive external signals for the right event marker inputs from the user with such signals being impressed on a circuit identical to that described above with respect to the left event marker. That is, a diode bridge 97 provides an output to constant current generator made up of resistors R34 and R35, zener diode CR7 and transistor Q7 providing an input to opto coupler U11, U11 has an output filtered by resistors 6, and capacitor C2, serving as an input to line driver 96. The left event marker signal and the right event marker signal, from line driver 96 are connected to the input data bus 39 received by data input buffer 34 in FIG. 4c.

The parameter set circuitry provides for various switch settings to be made by the operator. The days set switch array SA3 is made up of six single pole, single throw switches with the first terminal of each grounded and the second terminal of each connected as inputs to line driver 96. Voltage Vcc is connected to each of these second terminals by way of a single resistor in resistor array R36. By appropriately setting switches, the user may have marked the number of days of a given test.

The hours set switch array SA6 has six single pole, single throw switches with the first terminal of each grounded and the second terminal of each applied as inputs to line driver 105, a type 74LS244. Voltage Vcc is applied to each of these inputs via a single resistor of resistor array R37. A select signal from decoder 81 of FIG. 4 impressed on terminal P14 is used to enable driver 105. The outputs from line driver 98 are impressed on input data bus 39.

The minutes set switch array SA5 is made up of seven single pole, single throw switches with the first terminal of each being grounded and the second terminal of each being impressed as inputs on line driver 104, a type 74LS244. Voltage Vcc is impressed, through separate resistors of resistor array R38 on these input lines. Line driver 104 is enabled by the signal from decoder 81 impressed on terminal P15. The outputs of line driver 104 are connected to the input data line 39.

The linearizer, channel assignment switch array SA4 has eight single pole, single throw switches with the first terminal of each being grounded and with the second terminal of switches 1 through 6 being connected to line driver 103, a type 74LS244. The second terminal of the seventh switch is inverted through inverter 101 whose output provides another input to line driver 103. The second terminal of the eighth switch is inverted through inverter 102 and applied as another input to driver 103. The seventh switch provides a time on/off function and the eighth switch provides a grid on-off function. Line driver 103 is enabled by an output from decoder 81 provided on terminal P16. The output from line driver 103 is connected to input data bus 39.

In summary, the parameter set circuitry provides for desired linearization as explained above, for left and right event marker inputs, for setting of time in days, hours and/or minutes and for grid marking.

Figure 4C:
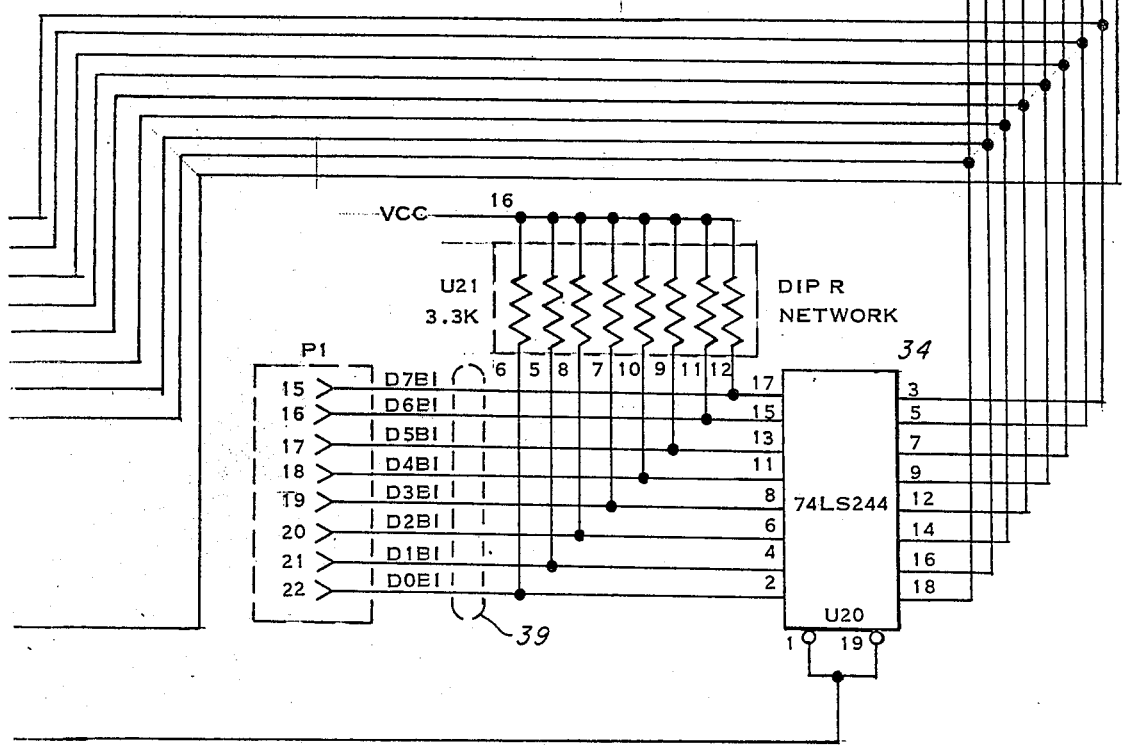
Figure 5A:
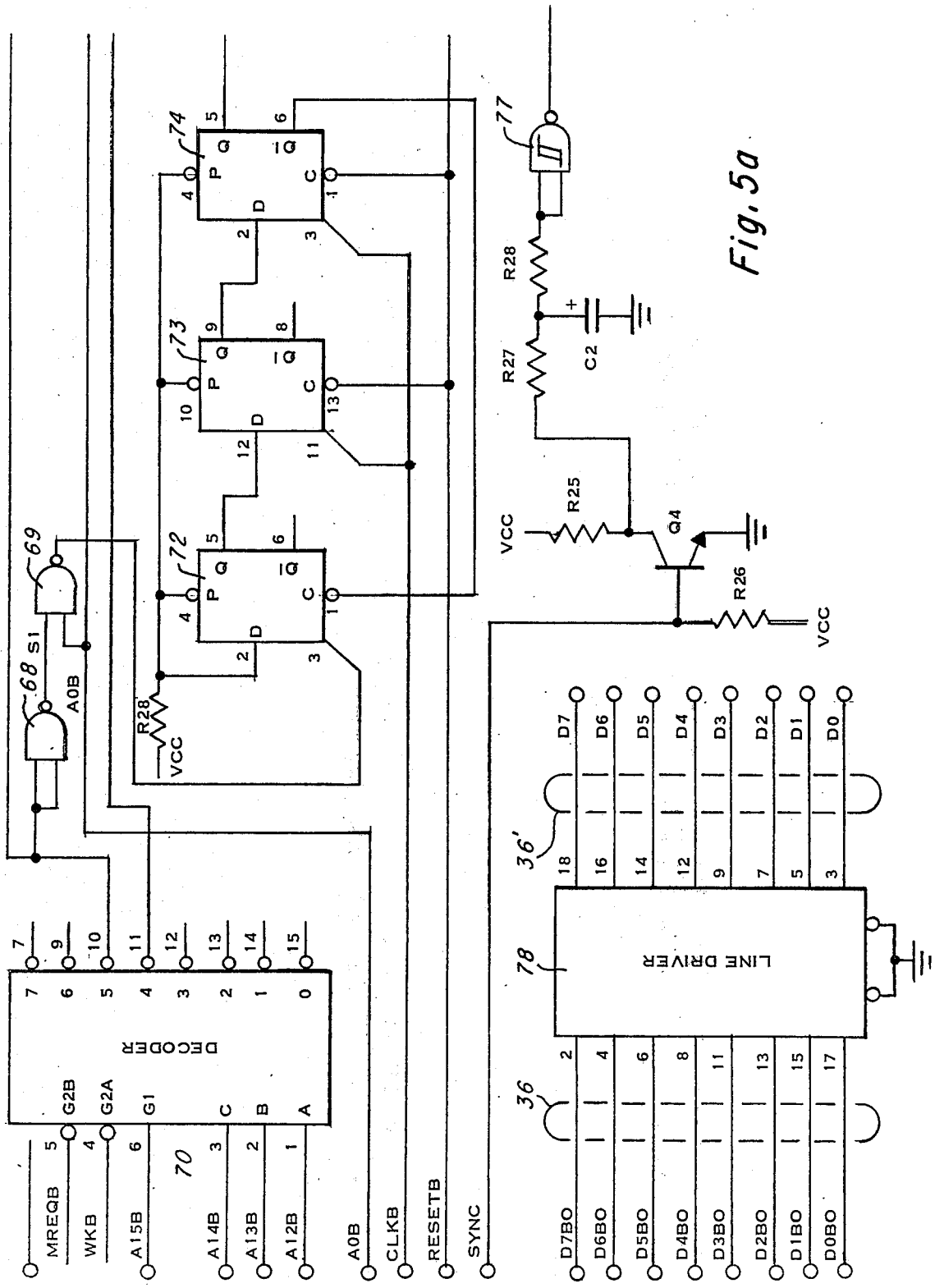
Figure 5B:
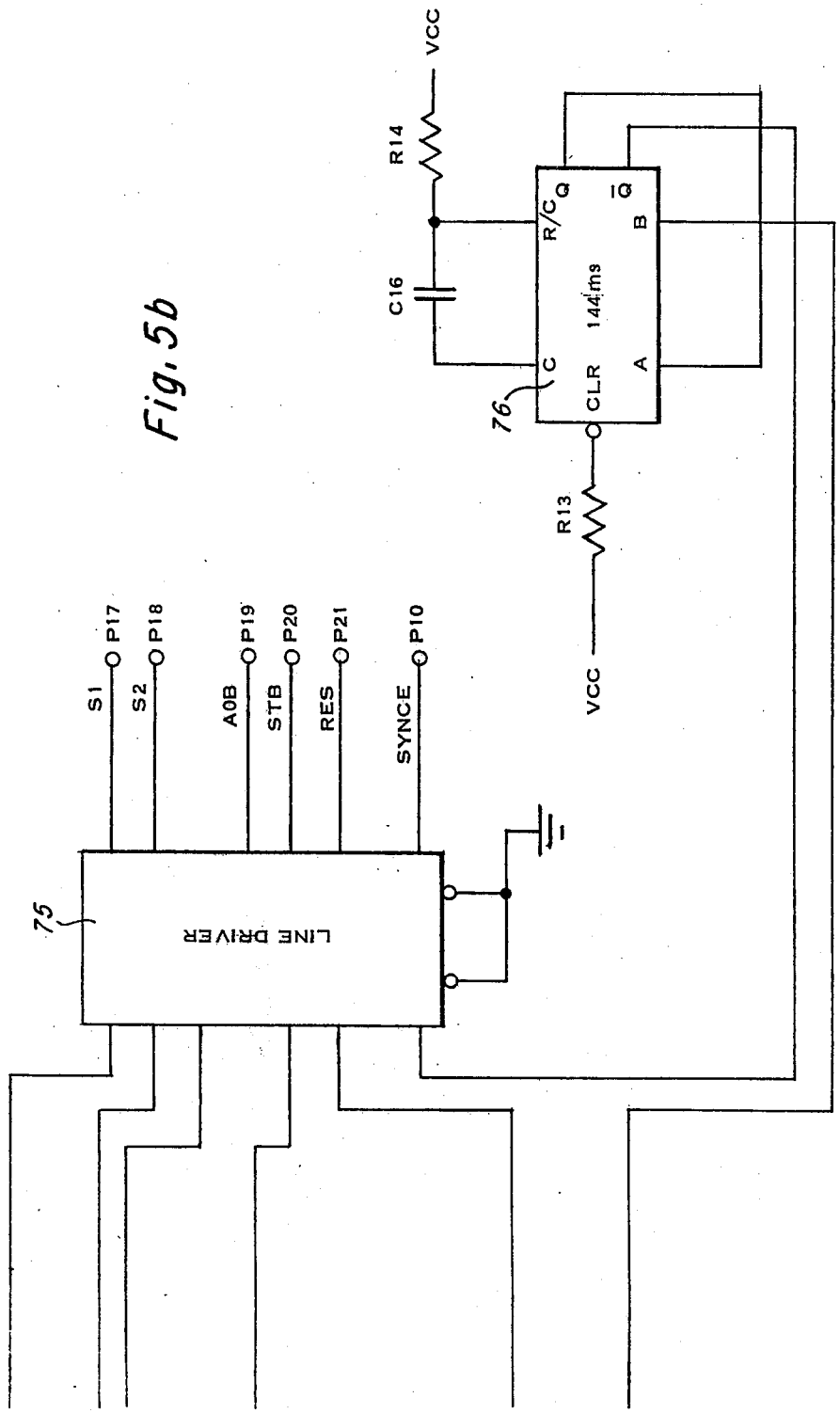
Figure 5C:
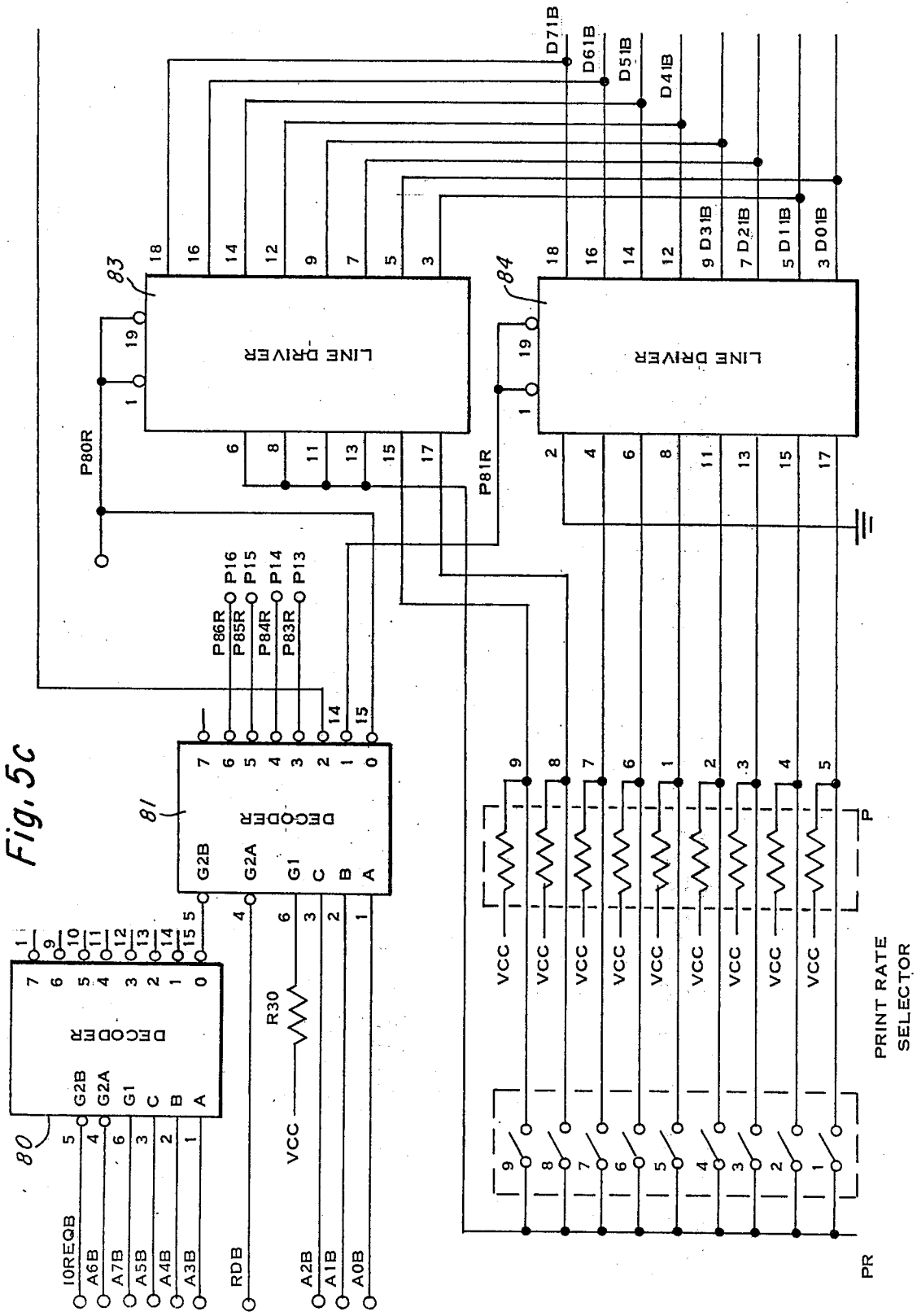
Figure 6A:
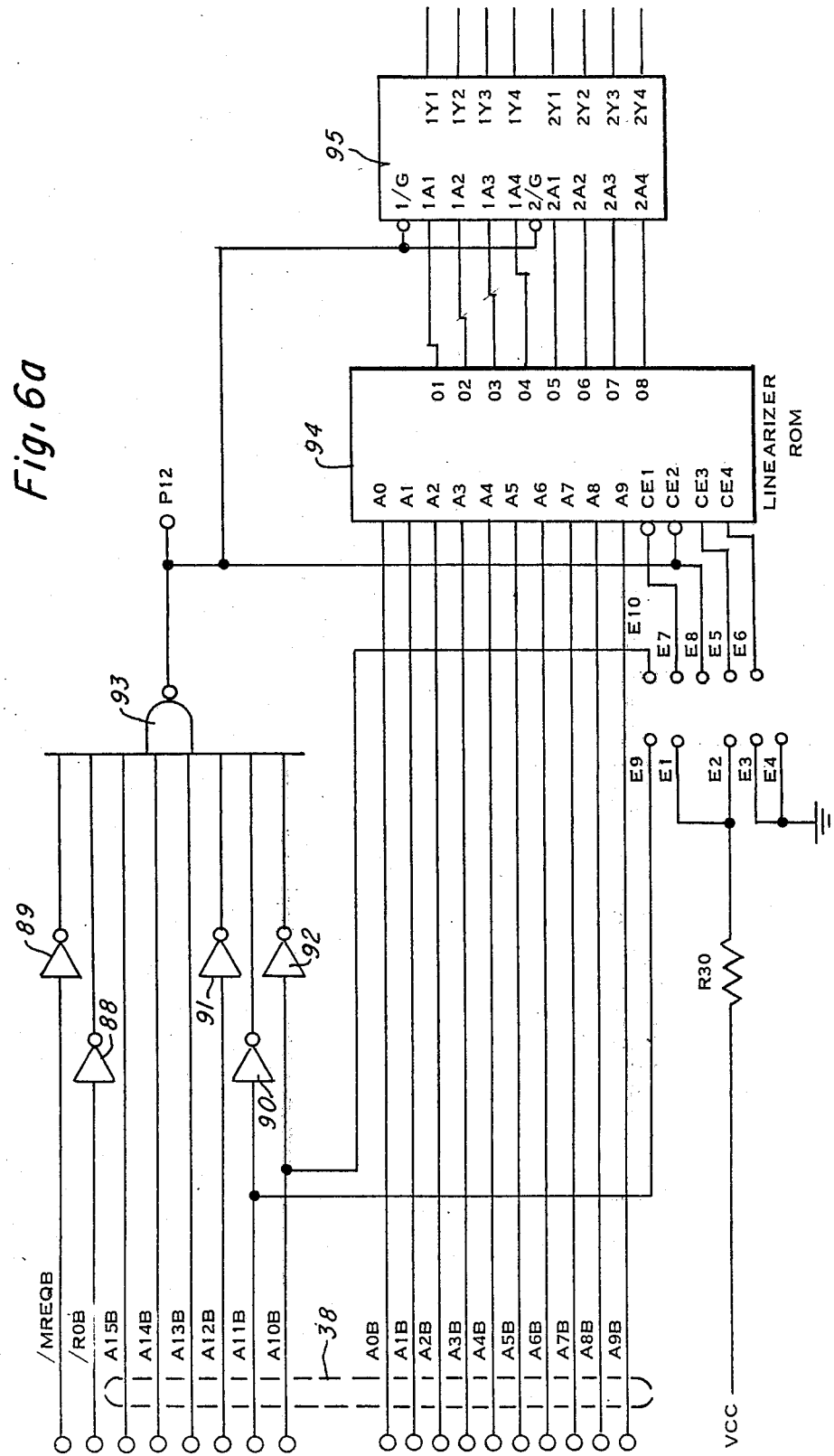
Figure 6C:
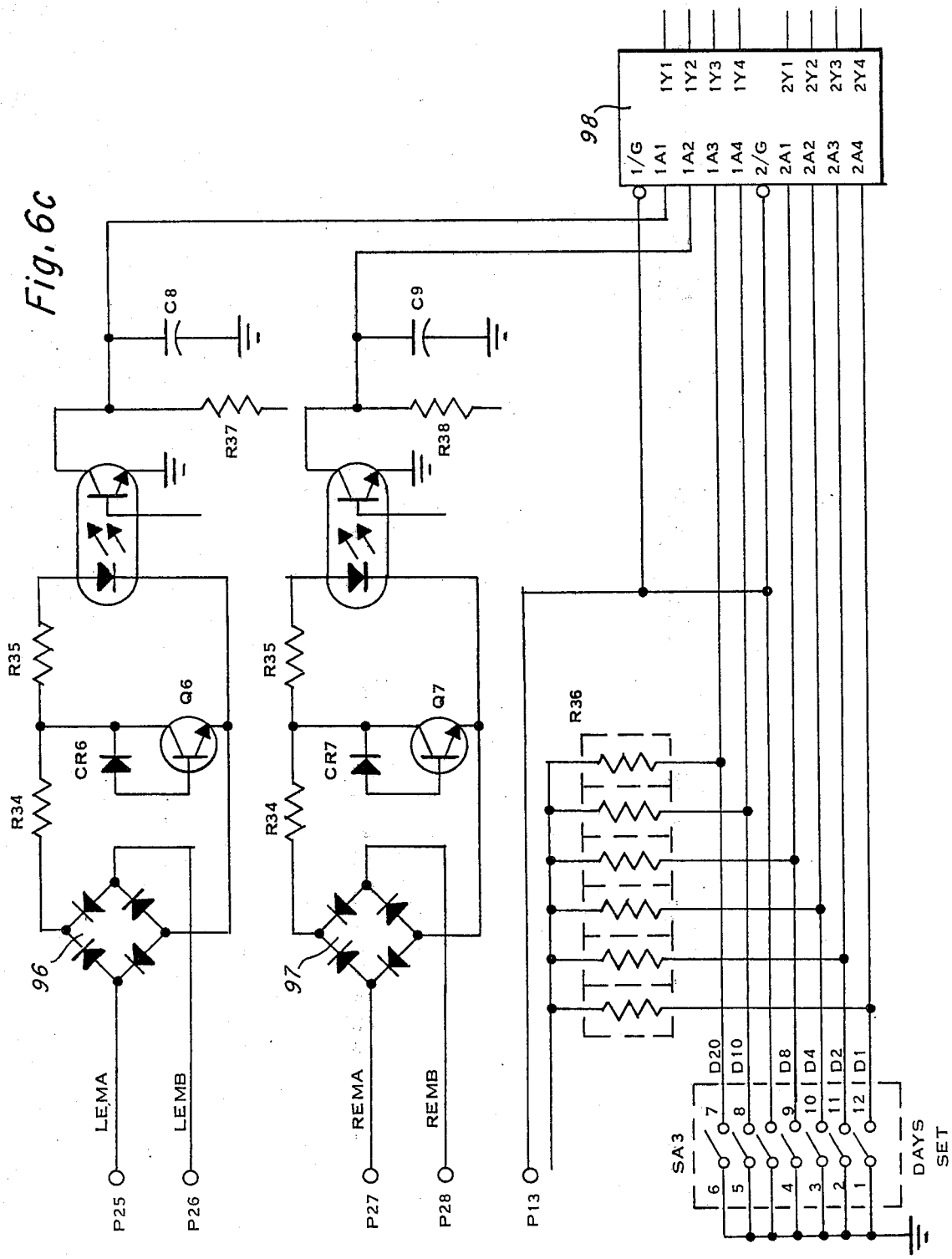
Figure 7A:
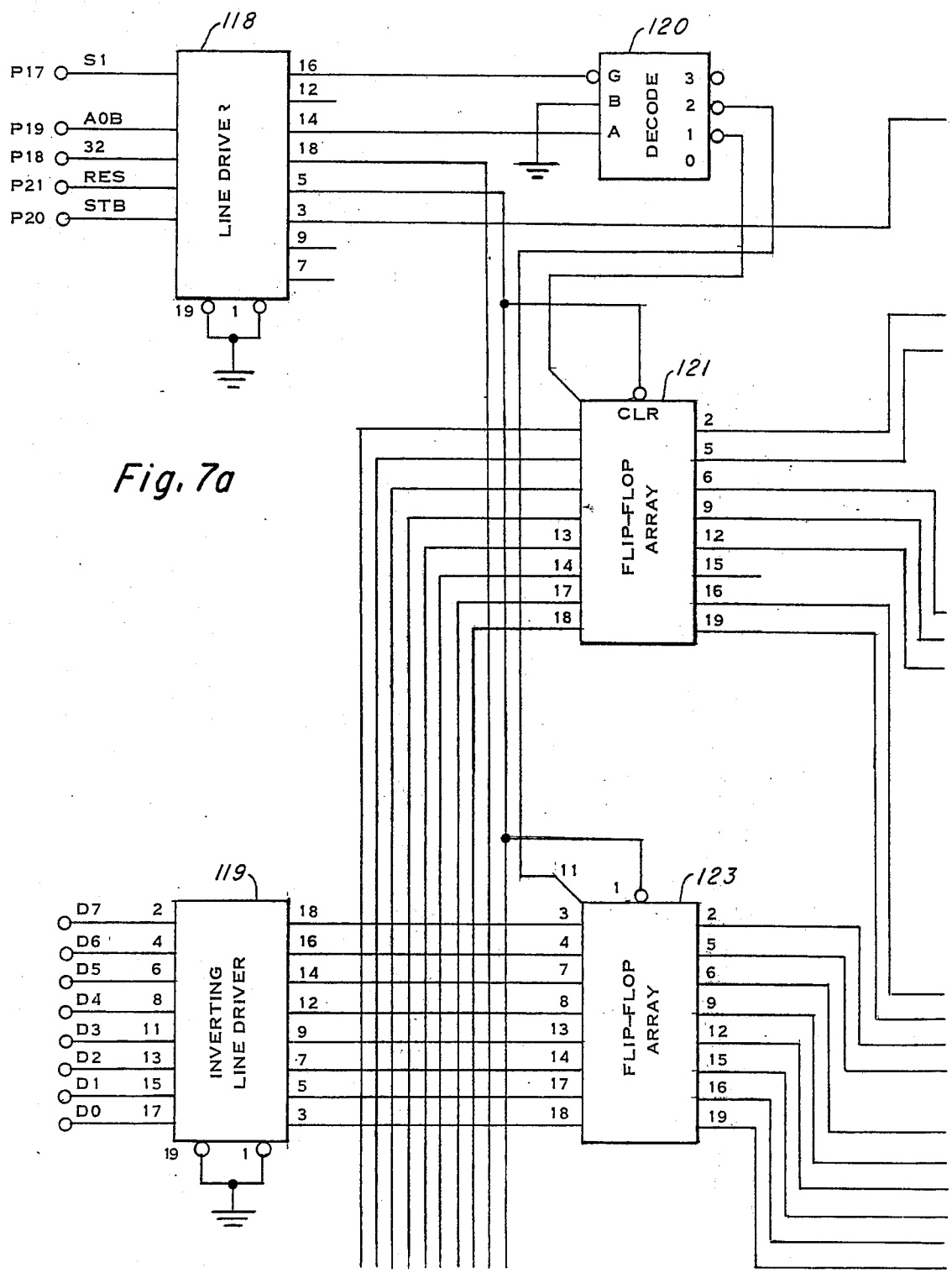
Figure 7B:
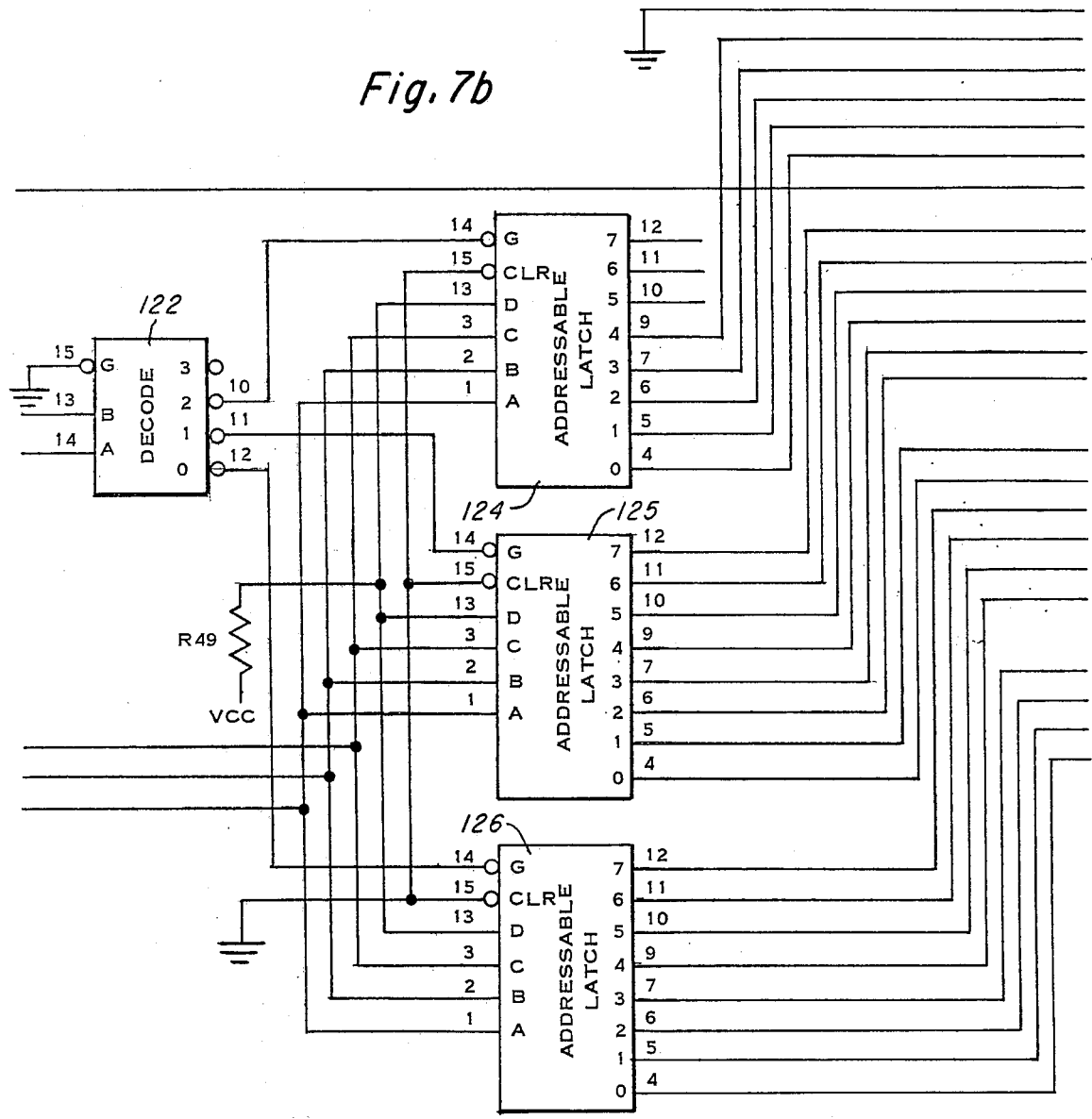
Figure 7C:
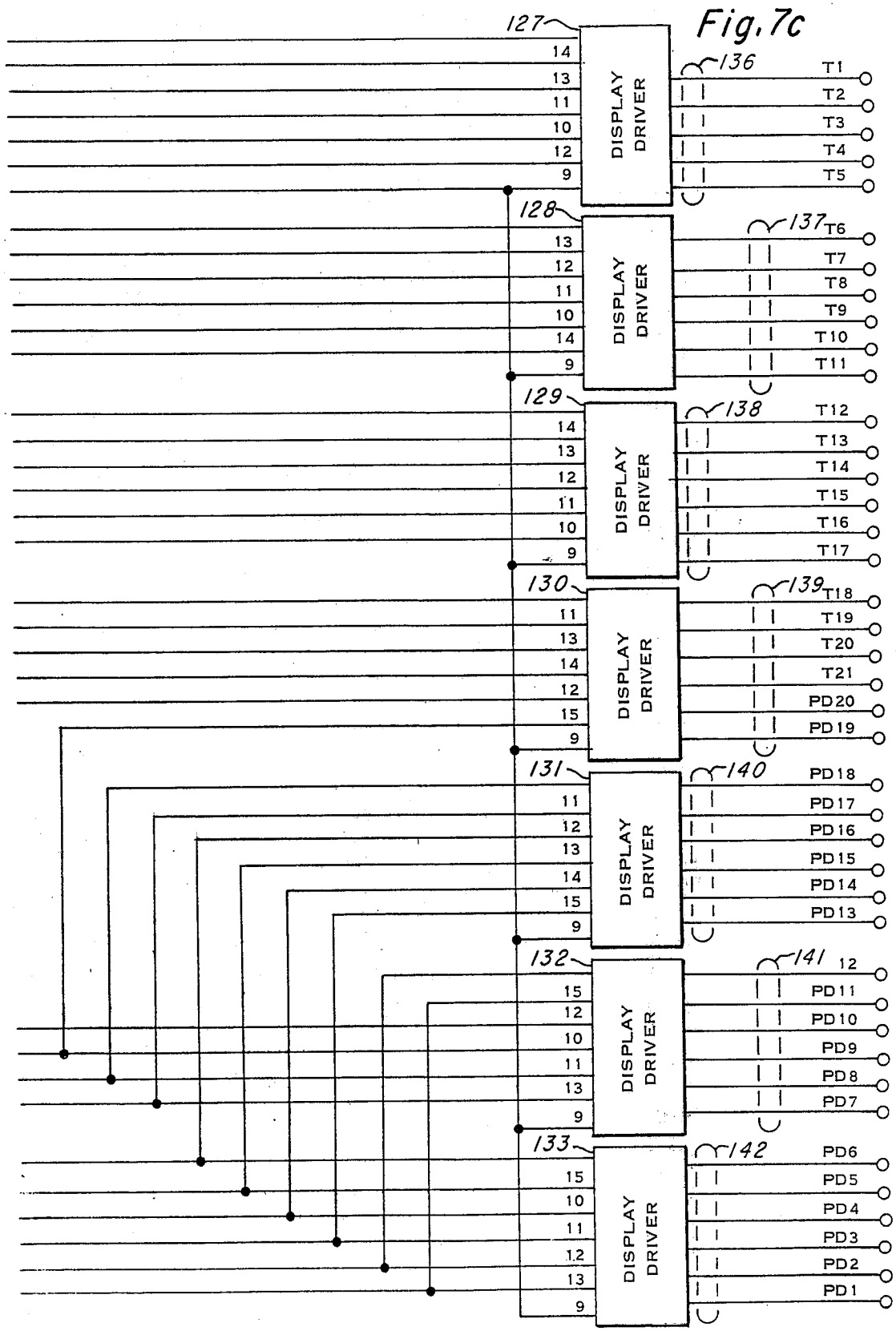

The driver circuitry is described in FIGS. 7a–7e. Signals D0- through D7- are applied as inputs to inverting line driver 119 (type 74LS240) the output of which is connected to data bus 36a and to flip flop arrays 121 and 123. Control signals S1, A0B, S2, RES and STB from line driver 75 of FIG. 4 provide inputs to line driver 118, a type 74LS244 which is continuously enabled. Memory strobe signal S1 from line driver 118 is connected to enable input G of decoder 120. Select input D is connected to ground and select input A receives signal A0B. One output from decoder 120 provides a clock input to flip flop array 121 and the other output from decoder 120 provides a clock input to flip flop array 123, each array being cleared by signal RES from terminal P21. Signals S2 and RES from line driver 118 are impressed on terminals P24 and P25 respectively. Signal RES by way of terminal P25 clears flip flop array 108, with memory strobe signal S2 by way of terminal P24, providing the clock input to flip flop array 108. Signals D0 through D7 provide the inputs to flip flop array 108. Signals D4 through D7 are output from flip flop array 108 and are inverted through inverter array 109 providing signals on terminals P23 through P26 respectively. Terminals P23 through P26 are connected to the windings of the stepper motor and carry phase information thereto.

Signal D1 from flip flop array 108 provides the inverse clear input and the active input B to a one shot multivibrator 111. The A input of one shot 111 is grounded and +5 volts is applied through resistor R42 to the R/C input. Capacitor C6 connects the terminal to the R/C terminal. The Q output provides a signal that turns off in approximately 18 milliseconds in this preferred embodiment to avoid turning on the printhead for an excessively long period.

The Q output from one shot 111 provides an input to inverter amplifier 113 whose output is impressed through resistors R44 and R46 to the collector of darlington transistor amplifiers Q12 and Q11 respectively.

Signal D0 from flip flop array 108 is applied in the same manner as D1 and has identical circuitry. One shot 112 has terminals C and R/C, interconnected by capacitor C7 with five volts supplied through resistor R43 to terminal R/C with the Q output of one shot 112 providing an input to amplifier inverter 114 whose output is applied through resistors R45 and R47 to the inputs of darlington transistor amplifiers Q11 and Q9, respectively. The collector output from amplifier Q12 is applied to terminal P27; the collector output from Q11 is applied to terminal P28; the collector output from Q10 is applied to terminal P29; the collector output from Q9 is applied to terminal P30. Terminals P27 through P30, as will be described later, provide the Vcc input to the printhead.

Signals D7 and D6 from flip flop array 121 provide select inputs B and A, respectively, for decoder 122 whose inverted enable input is grounded. The three outputs from decoder 122 are connected to the G enable terminal of each of addressable latches 124, 125 and 126, all of which are Texas Instruments type 74LS259 described beginning at page 7-376 of the TTL Data Book. D3, D4 and D5 outputs from flip flop array 121 provide inputs to terminals A B and C of each of addressable latches 124 through 126. Signal D1 from flip flop array 121 is connected to input 4A of each display drivers 130 and 132. Signal D0 from flip flop array 121 is connected to the 1A input of driver 130 and the 6A input of driver 132.

Display driver 127 has input terminal 1A connected to ground and input terminals 2A, 3A, 5A, 6A and 4A connected to output terminals 4, 3,2, 1 and 0 respectively of addressable latch 124. Display driver 128 has terminals 1A, 3A, 4A, 5A, 6A and 2A connected to terminals 7,6,5,4,3, and 2 of addressable latch 125. Display driver 129 has terminals 1A, 2A, 3A, 4A, 5A, and 6A connected to terminals 1 and 0 of addressable latch 125 and to terminals 7, 6, 5, and 4 of addressable latch 126, respectively. Display driver 130 has input terminals 6A, 5A, 3A and 2A connected to output terminals 3, 2, 1 and 0 of addressable latch 126.

Display driver 131 has its input terminals 1A through 6A connected to the output terminals of flip flop array 123 providing signals D2 through D7, respectively. Display driver 132 has terminals 2A, 1A, 5A and 3A connected to receive signals D1, D0, D7 and D6 respectively from flip flop array 123. Display driver 133 has its terminals 2A, 1A, 6A, 5A, 4A and 3A connected to receive signals D5 through D0, respectively from flip flop array 123.

Line drivers 127 through 133 are Texas Instruments type SN75490 thermal printhead driver, described beginning at page 39 of Texas Instruments Incorporated "The Display Driver Data Book for Design Engineers" dated 1977.

The outputs from these drivers are used to select the thermal elements or dots of the thermal printhead that are to be energized for recording purposes. Signals T1 through T5 from driver 127 form bus 136. Signals T6 through T11 from driver 128 form bus 137. Signals T12 through T17 from driver 129 form bus 138. Signals T18 through T21, PD20 and PD19 form bus 139 from driver 130. Signals PD18 through PD13 from driver 131 form bus 140. Signals PD12 through PD7 from driver 132 form bus 141. Finally, signals PD6 through PD1 from driver 133 form bus 142.

Figure 8:
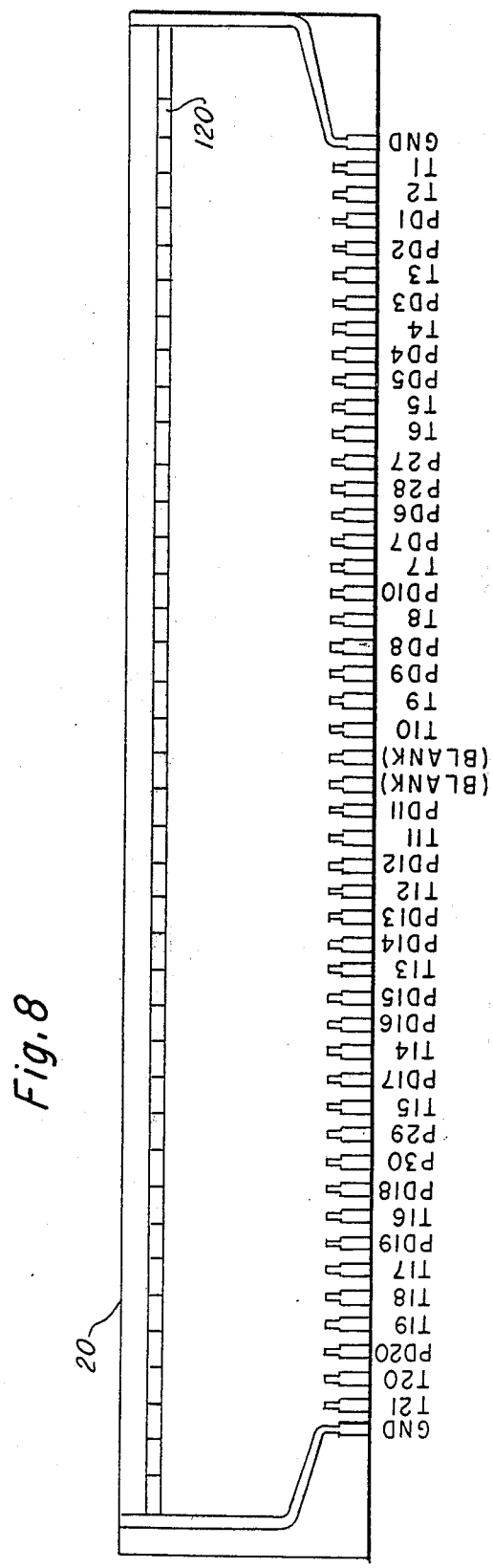
FIG. 8 illustrates the recording head employed in the solid state recorder.

FIG. 8 is a plan view of the printhead 20. Terminals T1 through T21 and PD1 through PD20 are shown. Also shown are Vcc input terminals P27 through P30. The two end terminals shown are grounded. The T and PD terminals have inputs in accordance with a decoding scheme to be described in connection with FIG. 11.

Figure 9:
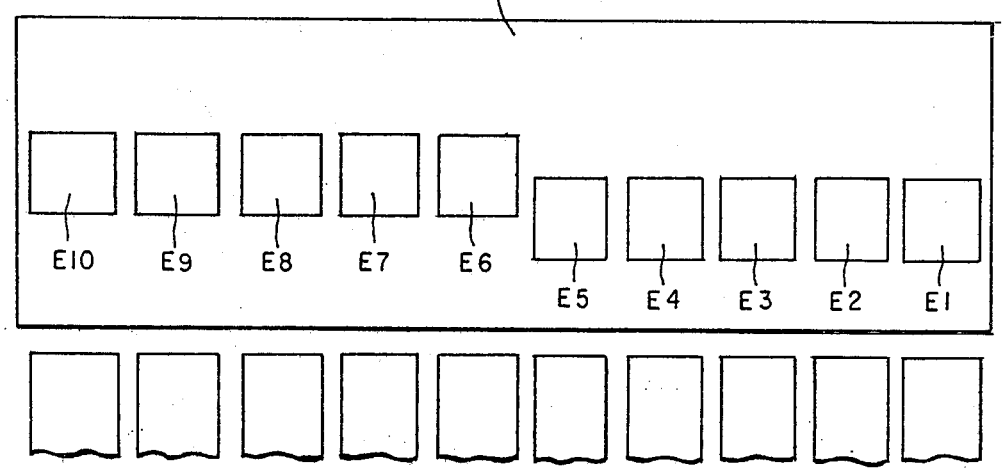
FIG. 9 shows one section of the recording head.

FIG. 9 shows, from section 120 of FIG. 8, one element of the printhead. Heat elements or dots E6 through E10 are seen as being offset from dots E1 through E5. As indicated earlier, in this preferred embodiment, the selected dots of E1 through E5 are first energized and then the selected dots from E6 through E10 are energized as the paper is moved. This provides a straight line of dots with the instantaneous power requirement being half of the value had the entire line been energized. It should be noted that there are 42 elements 120 that make up the entire printhead. The specifications of the printhead of this preferred embodiment which is a Texas Instruments type EPN5420, may be found in published Preliminary Specification for types EPN5200A EPN5200B, EPN5201A, EPN5201B thermal line printhead.

Figure 10:
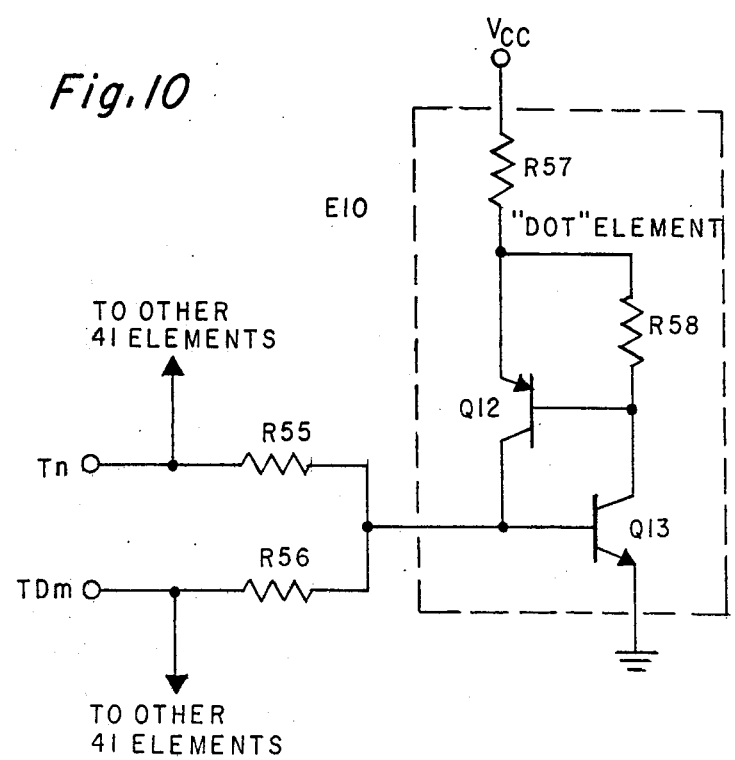
FIG. 10 is a schematic diagram of one thermal element and its associated circuitry.

FIG. 10 illustrates the circuitry for each dot and for the selection of the dot. The circuit is described in detail in U.S. Pat. No. 3,988,569—Thermal Printhead with Memory—issued on Oct. 26, 1976 and assigned to the assignee of this invention. A T signal is applied through resistor R55 to the base of transistor Q13 and the collector of transistor Q12. If a PD signal is also present, applied to the same point through resistor R56, then the combination of transistors Q12 and Q13 will be turned on, provided that voltage Vcc is applied through heater resistor R57 to the emitter of transistor Q12 whose base is tied to the emitter through resistor R58 and also to the collector of transistor Q13. Once energized, removal of either or both of the T and PD signals will not stop conduction. Voltage Vcc must be removed to stop the conduction.

Figure 11:
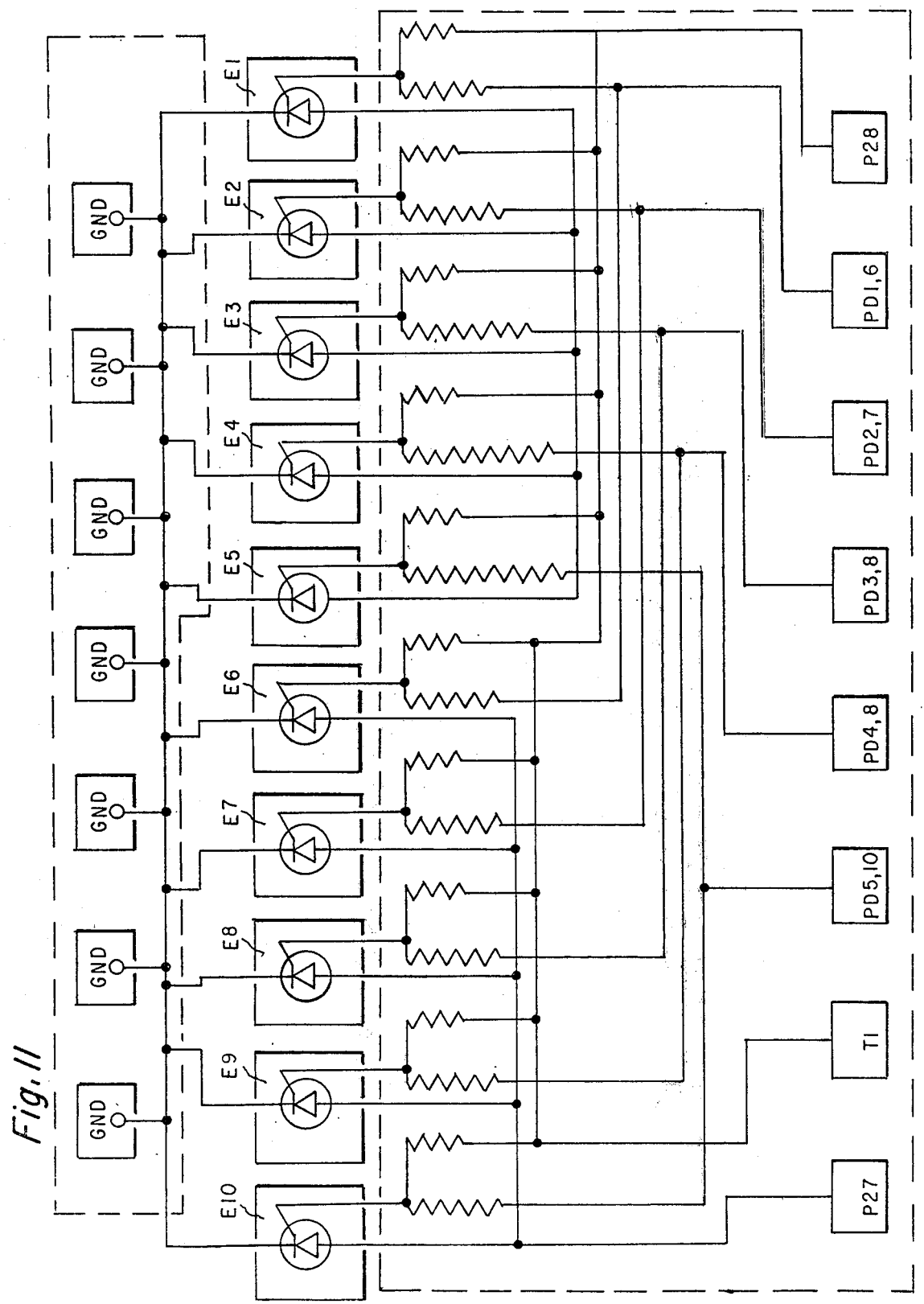
FIG. 11 is a schematic diagram of thermal elements in one section of the printhead.

FIG. 11 illustrates elements or dots E1 through E5 and E6 through E10. E10 is shown with resistors R55 and R56 as indicated in FIG. 10, providing the coincident curren inputs. Dots E1 through E9 are identical in structure. Terminal P27 provides Vcc to elements E6 through E10. Terminal P28 provides Vcc to terminals E1 through E5. Terminal T1 is connected to the heating element of E10 through resistor R55 and to the heating elements of E6 through E9 through equivalent resistors. Terminals PD5 and PD10 are connected through resistor R56 to element E10 and through an equivalent resistor to element E5. Signals PD4 and PD9 are applied in the same manner to elements E9 and E4. Signals PD3 and PD8, signals PD2 and PD7, and signals PD1 and PD6 are applied to elements E8 and E3, E7 and E2, E6 and E1 respectively. Vcc applied to P27 comes on at one time and Vcc applied to P28 comes on at another. In this manner the elements from rows E1 through E5 or E6 and E6 through E10 are selected at a different time.

Figure 12:
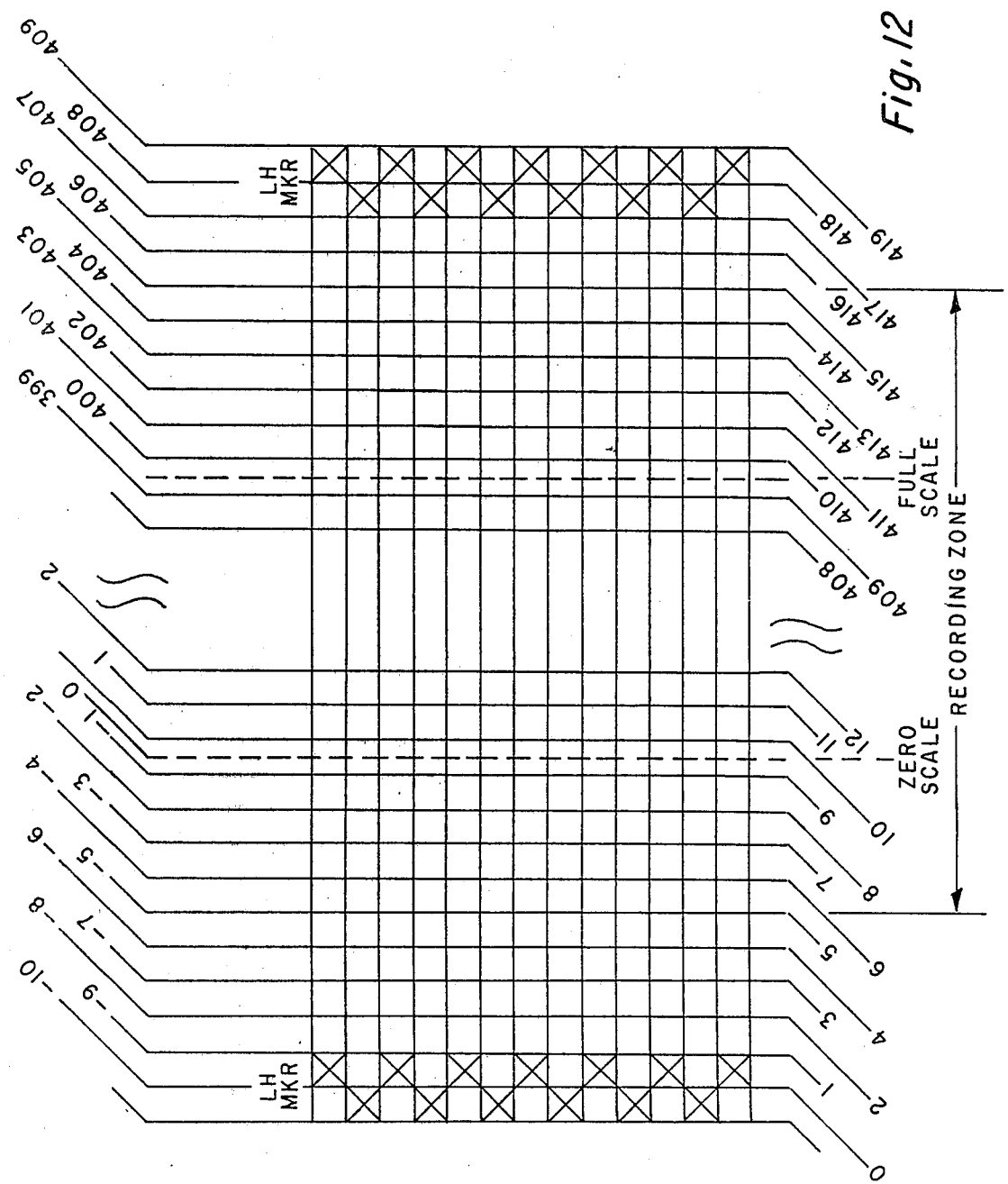
FIG. 12 illustrates the assignment of thermal elements of the recording head as the data and marker information.

FIG. 12 illustrates positioning of the left and right event markers. As shown, the left event marker uses dots designated −10 and −9 with data being recorded at dot −5. The right hand event marker is recorded at dots 408 and 409 with the full scale indication at dot 400. The recording zone is from dot −5 to dot 405.

Figure 13A:
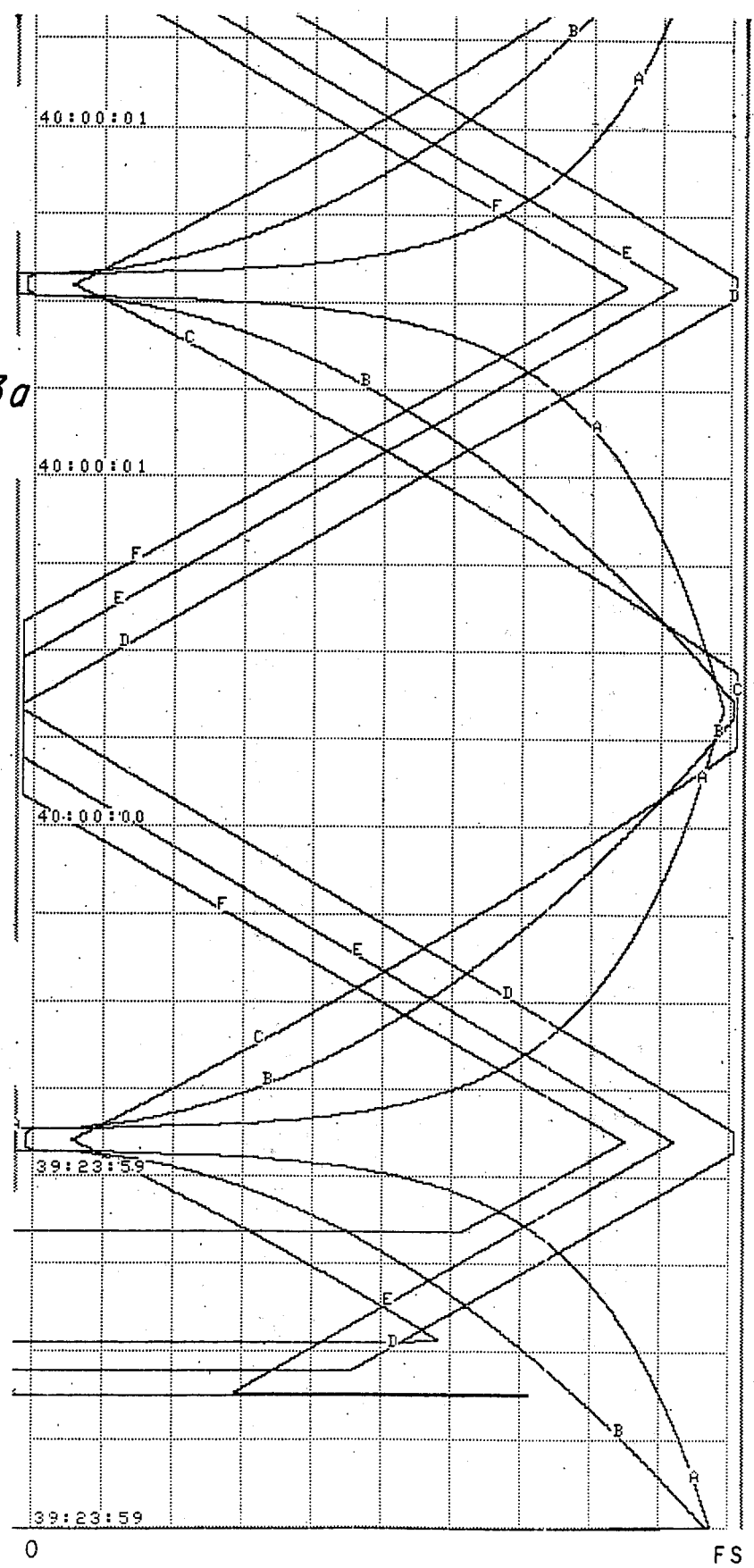
FIG. 13 shows an output recording from the solid state recorder.

FIG. 13 illustrates six channels, A,B,C,D,E, and F being recorded simultaneously. Time recordings 39:23:59 through 40:00:01 are shown. Also shown are the initial parameters from the parameter set circuitry, automatically printed out, illustrating channels A through F with alarms set for various limits, high and low, the linearization of various channels and channel select. Also shown is the selected chart speed, the printing interval when started and the fact that the grid is on.

The alarm signal high and low is an optional feature for providing a signal when a particular parameter is reached. The signal can then be used to stop the apparatus or to sound an audible or visual alarm.

MODE OF OPERATION

The control of the solid state recorder is accomplished through the microcomputer. In general terms, the channels to be activated are selected by the channel selector switch SA2 of FIG. 4. The channels to be linearized, as determined by the type of input information, are selected by switch SA4 of FIG. 5. The grid and time selections are also made through the appropriate switches SA3 through SA6 of FIG. 5. Also, connections are made appropriately to input left and right event marker signals and then to bridges 96 and 97 of FIG. 5. Linearizer ROM 94 has preset values at the various addresses corresponding to that address value as modified to linearize the curve.

Analog information from the channels is introduced into A to D conversion unit 13 of FIG. 1b. As indicated previously, CPU 14, through the use of microprocessor 25 and counter timer circuit 30, aids in the A to D conversion process by counting from a voltage maximum to a point at which a linear curve passes through a reference to thereby assign a digital equivalent. The signal, indicating passing through the reference, comes in on appropriate lines D0BI through D7BI and are input to the system through data input buffer 34. Once digitized, the information is ready for processing. Input data is stored in RAMS 28a and 28b, being read out when directed by the system decoder and control 40, which in turn is activated by microprocessor 25. That digital information passes through the interface circuitry 16 through driver inverter 78 to driver circuit 15 through inverter 119, through appropriate selectors to display drivers 127-133. Phase information for the stepping motor, provided from the microprocessor 25 through the data bus to flip flop array 108 of FIG. 7, is ultimately provided to the stepping motor through terminals P23 through P26.

ROMS 24a through 24d contain the instructions that dictate the operation of the microprocessor 25. Microprocessor 25 operates in conjunction with CTC30 in a manner as described in the Z80 publication cited earlier. The contents of the ROM is shown in the map of FIGS. 14a-14i. An index to the various programs within the ROM is present at the head of the map of FIG. 14a. Some program highlights follow.

The program labeled INET is simply for power up and initialization.

The program labeled SSR indicates the instructions necessary for the computer to keep track of grids, with grids being fifty lines apart. Each grouping of four grid lines makes a quadrant and four quadrants make up a sector. Sectors are commonly marked and since there are as many as four different scales present because of the linearization, the program makes certain that no printing overlaps other printing. Scales and trace identifiers are printed once in each sector. The computer must keep track of exactly what line is being printed and what special code must then be executed to print time, etc.

There is an interrupt service routine for causing subroutines to act under certain circumstances.

There is a program for translating odd map and even map. This program takes care of printing in one row and then the other of the printhead as described above. The program must form a map so that the data is mapped in a special way to appear in the right place when printed. The program is present to reset dot buffers. The program enables the printing of event markers.

Still another program causes advancing the paper at a high rate.

There is a routine for inserting the time characters into the character buffer to be printed so that there is a real time clock indicating days, hours and minutes.

There is a subroutine for printing that causes the dot information to be output to the printhead.

There is a step subroutine for causing the stepper motor to make one step.

The interrupt service routine is the program that handles the CTC 30 when CTC 30 generates an interrupt.

The interrupt service ISERV program is the program that keeps track of relatively slow timers such as time of day, hours, and minutes.

There is a program referred to as a dot to line converter which generates a trace on the recorder connecting the last previous dot to the new previous dot for a given trace.

There is an analog routine associated with A to D converters for performing the timing functions mentioned above.

There is an alarm handler routine for handling optional alarms.

There is a linearization routine for performing linearization on selected data channels for outputting the data to the linearizer ROM.

There is an initial parameter printout routine for printing the initial setup of the recorder.

All of the programs for causing the microprocessor 25 to operate in a predetermined manner are shown in FIGS. 14a-14i.

Obviously, one skilled in the art may easily substitute components for those shown in this preferred embodiment. However, such a use of equivalent components is anticipated with the components shown herein being shown by way of example only. Furthermore, the terms and expressions herein are used as terms of description and not of limitation and there is no intent in the use thereof to exclude equivalents on the contrary to include all equivalents, modifications and adaptions thereof that fall within the spirit and scope of the invention.

What is claimed is:

1. A chart recorder for thermal recording on heat sensitive paper that is advanced at a selectable rate by a motive means having means for receiving a plurality of electrical signals representing various parameters to be recorded, and annotated, as individual traces, comprising:
    (a) a fixed printhead having at least one horizontal line of a plurality of individually energizable thermal elements in thermal contact with the heat sensitive paper;
    (b) drive means connected to the printhead for energizing selected thermal elements and for activating the motive means; and
    (c) digitizing means for receiving and simultaneously digitizing the plurality of electrical signals; and
    (d) digital computer means including central processor means, timing means, read-only memory means having instructions means therein for controlling the operation of the computer means, and read and write memory means for storing digital data including the plurality of digitized signals to be recorded, the computer means adapted to receive the plurality of digitized signals and connected to the drive means for causing the drive means to energize selected thermal elements in conformance with the digitized signals and for causing the activation of the motive means to advance the heat sensitive paper.

2. The recorder of claim 1 wherein the central processor means comprises a microprocessor having connections for input/output control, address and data signals.

3. The recorder of claim 2 wherein the digital computer means further comprises decoder and control means connected to receive address and memory request control signals from the microprocessor to provide memory range select signals from the read-only memory and the random access memory.

4. The recorder of claim 1 wherein the motive means comprises a stepper motor.

5. The recorder of claim 4 wherein the read and write memory comprises a random access memory.

6. The recorder of claim 4 wherein the timing means comprises a microcomputer counter timer circuit for timing computing events of the central processor means.

7. The recorder of claim 4 further comprising:
(e) interface means, connected to the digital computer means and to the drive means for receiving a specified range of addresses, and control signals from the digital computer means for providing to the driver means control signals including address strobe signals.

8. The recorder of claim 7 wherein the printhead has two horizontal lines of thermal elements, the sum of the number of thermal elements in each line totalling the plurality of individually energizable thermal elements.

9. The recorder of claim 8 wherein each thermal element of the printhead is coincidentally selectable and is de-energized by removing the supply voltage (Vcc).

10. The recorder of claim 9 wherein the drive means comprises:
(b) (i) first selection circuitry for selectively energizing motor windings of the stepper motor;
(ii) second selection circuitry for applying Vcc to the selected horizontal line of thermal elements; and
(iii) third selection circuitry for coincidentally selecting the printhead thermal elements.

11. The recorder of claim 10 wherein the central processor means comprises a microprocessor having connections for input/output control, address and data signals.

12. The recorder of claim 11 wherein the read and write memory comprises a random access memory.

13. The recorder of claim 12 wherein the timing means comprises a microcomputer counter timer circuit for timing computing events of the microprocessor.

14. The recorder of claim 13 wherein the digital computer means further comprises decoder and control means connected to receive address and memory request control signals from the microprocessor to provide memory range select signals for the read-only memory and the random access memory.

15. A solid state chart recorder for thermal recording on heat sensitive paper that is advanced at a selectable rate by a motive means, having means for receiving a plurality of input channels, each channel having electrical signals representing various parameters to be recorded, and annotated, as individual traces, comprising:
(a) a fixed printhead having at least one horizontal line of a plurality of individually energizable thermal elements in thermal contact with the heat sensitive paper;
(b) drive means connected to the printhead for energizing selected thermal elements and for activating the motive means;
(c) digitizing means for receiving and simultaneously digitizing the plurality of electrical signals;
(d) digital computer means including central processor means, time means, read-only memory means having instructions set therein for controlling the operation of the computer means, and read and write memory means for storing digital data including the plurality of digitized signals to be recorded, the computer means adapted to receive the plurality of digitized signals and connected to the drive means for causing the drive means to energize selected thermal elements in conformance with the digitized signals, and for causing the activation of the motive means to advance the heat sensitive paper;
(e) bus means interconnecting the printhead, the drive means and the digital computer means; and
(f) means for linearizing the electrical signals of at least one channel and for transmitting the linearized signals to the bus means.

16. The recorder of claim 15 wherein a means for linearizing includes a read-only memory which stores the linearized outputs which are placed on the bus means.

17. The recorder of claim 16 further comprising event marker means having voltage input means for marking the paper when a voltage input is received and corresponding signals placed on the bus means.

18. The recorder of claim 16 further comprising time print means having switch means for switching to a reference voltage and a driver output to the bus means for printing time on the paper.

19. The recorder of claim 16 further comprising grid print means having a switch input for switching to a reference voltage and a driver output to the bus means for printing grids on the paper.

20. The recorder of claim 19 further comprising time print means having switch means for switching to a reference voltage and a driver output to the bus means for printing time on the paper.

* * * * *